(12) United States Patent
Jacobsen et al.

(10) Patent No.: US 7,590,471 B2
(45) Date of Patent: Sep. 15, 2009

(54) INTELLIGENT SPRINKLER IRRIGATION SYSTEM

(75) Inventors: Stephen C. Jacobsen, Salt Lake City, UT (US); Fraser M. Smith, Salt Lake City, UT (US)

(73) Assignee: Sterling Investments LC, Salt Lake City, UT (US)

( * ) Notice: Subject to any disclaimer, the term of this patent is extended or adjusted under 35 U.S.C. 154(b) by 398 days.

(21) Appl. No.: 11/292,821

(22) Filed: Dec. 2, 2005

(65) Prior Publication Data

US 2006/0144957 A1    Jul. 6, 2006

Related U.S. Application Data

(60) Provisional application No. 60/633,059, filed on Dec. 2, 2004.

(51) Int. Cl.
*G06F 19/00* (2006.01)
*G05D 11/00* (2006.01)
*G05D 7/00* (2006.01)

(52) U.S. Cl. .................. 700/282; 700/283; 700/284; 239/69; 239/200; 239/240; 239/237; 137/485; 137/624.12

(58) Field of Classification Search ......... 700/282–284; 239/69, 240, 200, 237; 137/485, 624.12
See application file for complete search history.

(56) References Cited

U.S. PATENT DOCUMENTS

| | | | |
|---|---|---|---|
| 5,248,093 A * | 9/1993 | Pleasants ..................... 239/239 |
| 5,280,854 A * | 1/1994 | Das ............................. 239/227 |
| RE35,037 E | 9/1995 | Kah, Jr. | |
| 6,047,949 A | 4/2000 | Beauchemin, Jr. | |
| 6,402,048 B1 | 6/2002 | Collins | |
| 6,648,073 B1 * | 11/2003 | Jernigan et al. ............. 166/336 |
| 7,051,952 B2 * | 5/2006 | Drechsel ..................... 239/256 |
| 2002/0125338 A1 | 9/2002 | Collins | |
| 2002/0159070 A1 * | 10/2002 | Maeda et al. ............... 356/496 |

* cited by examiner

*Primary Examiner*—Michael D Masinick
(74) *Attorney, Agent, or Firm*—Thorpe North & Western LLP

(57) ABSTRACT

The present invention features an intelligent sprinkler irrigation system for delivering fluid to an arbitrarily-shaped area in a precise manner. In general, the system comprises (a) a fluid source comprising a pressurized fluid; (b) at least one programmable sprinkler head fluidly connected to the fluid source; and (c) a computer system configured to control the sprinkler head to precisely deliver fluid according to a predetermined sprinkler function. The computer system comprises a teach mode, wherein a plurality of drive parameters are learned and recorded. These drive parameters function to dictate the specific vector positioning of the sprinkler head during execution of the sprinkler component. The teach mode is further configured to learn and record a plurality of flow parameters, which function to control the fluid delivery component of the sprinkler head (e.g., the valve or nozzle), and more particularly, the manner in which the fluid is delivered or emitted from this component.

63 Claims, 12 Drawing Sheets

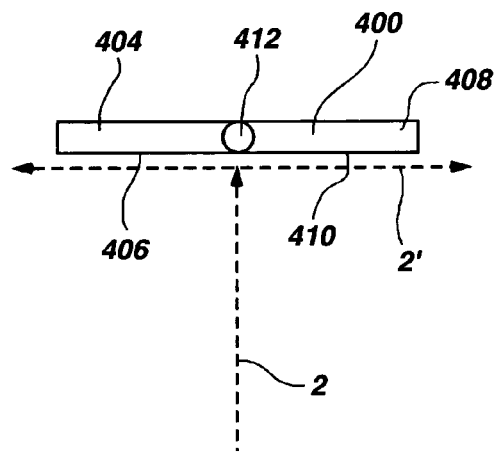
FIG. 12-A
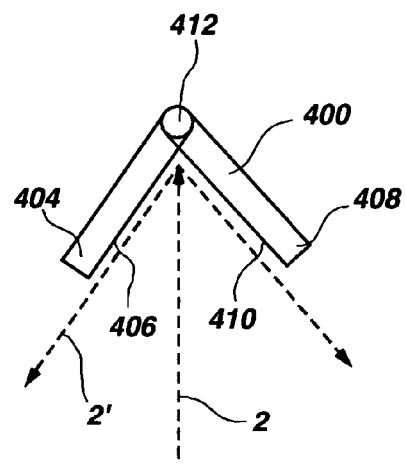
FIG. 12-B
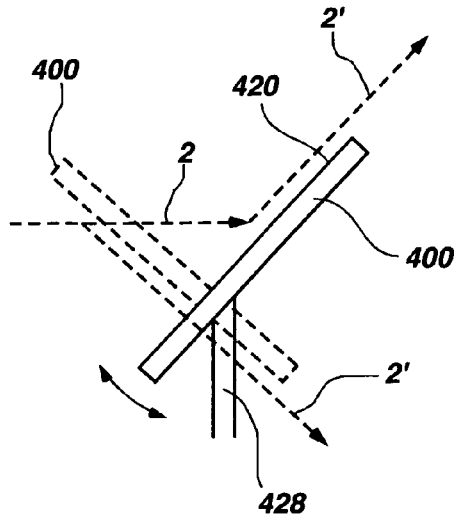
FIG. 12-C

INTELLIGENT SPRINKLER IRRIGATION SYSTEM

This application claims priority to U.S. Provisional Patent Application No. 60/633,059, filed in the United States Patent and Trademark Office on Dec. 2, 2004, and entitled, "Intelligent Sprinkler Irrigation System," which application is incorporated by reference in its entirety herein.

FIELD OF THE INVENTION

The present invention relates generally to sprinkler and/or irrigation systems for delivering fluid to an area for one or more purposes, as well as associated methods for irrigating an area. The present invention also relates to sprinkler heads. More particularly, the present invention relates to an intelligent sprinkler irrigation system, and associated methods for using the system, wherein the system utilizes one or more single programmable sprinkler heads capable of learning and executing a pre-determined sprinkler function that dictates a fluid flow path and rate to precisely deliver a fluid to any location within an arbitrarily-shaped area.

BACKGROUND OF THE INVENTION AND RELATED ART

Sprinkler irrigation systems are common in the art and have enabled users to conveniently irrigate large areas with little effort. The most common type of sprinkler irrigation system currently in use is a pressurized fluid distribution system. These conventional systems typically employ an extensive network of fluid delivery means (e.g., pipes, hoses, etc.) feeding fluid to a plurality of sprinkler heads strategically spaced or positioned about or within an area to be irrigated. These pressurized fluid distribution systems are commonly used in a variety of industries and in a variety of applications. One of the most common applications in which these systems are utilized is within a residential and/or commercial setting, wherein the system is installed to provide irrigation to lawns, gardens, planted areas, etc. These systems are also commonly used in agricultural settings for watering crops.

While these traditional systems have provided a significant advantage over manual or even less developed irrigation techniques, there still exists several inherent deficiencies in these traditional systems, especially in light of the significant advances made in the computer and technology industries. First, these systems are expensive to install. There are several parts that must be purchased, such as pipes, sprinkler heads, fittings, nozzles, valves, etc. All of these parts must be fit together according to a master plan, which is extremely expensive and labor intensive. Second, these systems are expensive to operate. Not only are they expensive to install, but they are also not very robust or durable over long periods of time and often need repairs and significant upkeep. Moreover, these systems tend to provide large amounts of coverage overlap, which ultimately leads to waste and increased costs for normal everyday operation. Third, it is difficult to cover target areas without multiple sprinkler heads. The sprinkler heads used with these systems are very limited in their fluid delivery options. Because of this, tight corners or curved areas may require many different sprinkler heads to be positioned about a particular area in order to fully cover the area. This complicates the system, as well as contributing to coverage overlap. Other disadvantages will be apparent to one skilled in the art.

SUMMARY OF THE INVENTION

In light of the problems and deficiencies inherent in the prior art, the present invention seeks to overcome these by providing a unique system and method for irrigating an arbitrarily-shaped area.

Therefore, it is an object of some of the exemplary embodiments of the present invention to provide a intelligent sprinkler irrigation system capable of selectively and precisely irrigating any portion or all of an arbitrarily-shaped area.

It is another object of some of the exemplary embodiments of the present invention to provide a programmable sprinkler head that is capable of delivering a fluid to any location within an arbitrarily-shaped area.

It is still another object of some of the exemplary embodiments of the present invention to provide a intelligent sprinkler irrigation system, wherein a single programmable sprinkler head precisely irrigates an arbitrarily-shaped area according to one or more pre-determined sprinkler functions.

It is a further object of some of the exemplary embodiments of the present invention to provide a intelligent sprinkler irrigation system that senses environmental conditions and/or changes and that can adjust the delivery of the fluid to compensate for these to still precisely irrigate the area as intended.

It is still a further object of some of the exemplary embodiments of the present invention to eliminate the need for extensive underground piping systems, as well as different nozzles to provide adequate coverage.

It is still a further object of some of the exemplary embodiments of the present invention to provide an irrigation system that effectively conserves water, while still providing adequate irrigation.

Although several objects of some of the various exemplary embodiments have been specifically recited herein, these should not be construed as limiting the scope of the present invention in any way. Indeed, it is contemplated that each of the various exemplary embodiments comprises other objects that are not specifically recited herein. These other objects will be apparent to and appreciated by one of ordinary skill in the art upon practicing the invention as taught and described herein.

To achieve the foregoing objects, and in accordance with the invention as embodied and broadly described herein, the present invention features an intelligent sprinkler irrigation system for delivering fluid to an arbitrarily-shaped area in a precise manner. In general, the system comprises (a) a fluid source comprising a pressurized fluid; (b) at least one programmable sprinkler head fluidly connected to the fluid source; and (c) a computer system configured to control the sprinkler head according to a pre-determined sprinkler function. In essence, the present invention contemplates any perimeter or boundary being defined and a corresponding sprinkler function created to irrigate or non-irrigate that perimeter or boundary.

In one exemplary embodiment, the programmable sprinkler head comprises an inlet for receiving the fluid; a valve component fluidly connected to the inlet for regulating emission of the pressurized fluid; and a multidirectional movement component configured to vector position the sprinkler head and resulting fluid delivery to any point or region. The vector positioning of the fluid delivery point, along with the regulation of the fluid flow, will allow the programmable sprinkler head to provide accurate fluid delivery to any single point or region within the arbitrarily-shaped area.

The valve component is specially designed to provide a continuous or periodic non-fractionated stream or jet of fluid to a precise location or point within reach of the sprinkler head. The valve component may also be configured or operated to provide a non-fractionated bolus of fluid to the same point. In one exemplary embodiment, the valve component comprises a specially designed sleeve valve supported within the sprinkler head. This type of valve, or a valve of any kind, is not to be considered limiting. Indeed, other valves besides a sleeve valve may be utilized. In addition, any type of nozzle or other fluid delivery means commonly known in the art for providing either a fractioned or non-fractioned stream or bolus of fluid is contemplated for use herein, although the use of fractionated fluid delivery will most likely lead to a decrease in accuracy.

The computer system is used to control the various components of the programmable sprinkler head, and also to control the programming and ultimate operation of the sprinkler head. As such, the computer system comprises a teach mode, wherein a plurality of drive parameters, corresponding to at least a portion of the arbitrarily-shaped area, are learned and recorded. These drive parameters function to dictate the specific vector positioning of the sprinkler head by the movement component during execution of the sprinkler component. These drive parameters further function to define, at least in part, the pre-determined sprinkler function. The teach mode is further configured to learn and record a plurality of flow parameters. The flow parameters also correspond to at least a portion of the arbitrarily-shaped area. However, the flow parameters function to control the valve component of the sprinkler head, and more particularly, the manner in which the fluid is delivered or emitted from the valve component. In a typical system, the flow parameters operate in conjunction with the drive parameters to further define the pre-determined sprinkler function and to increase the accuracy of the fluid delivery about a pre-determined fluid flow path. The computer system further comprises an operation mode for executing one or more stored pre-determined sprinkler functions to precisely deliver the fluid to at least a portion of the arbitrarily-shaped area.

A pre-determined sprinkler function is a computer readable program corresponding to a pre-determined fluid flow path designed for proper watering of the arbitrary area. The pre-determined sprinkler function is taught or learns to deliver fluid precisely along the pre-determined fluid flow path during execution or operation. The pre-determined sprinkler function is governed by a plurality of drive parameters and flow parameters compiled to create the appropriate sprinkler function. Once an area is identified for irrigation and a fluid flow path about or within this area is pre-determined, the programmable sprinkler head is programmed by assigning a plurality of drive and flow parameters at respective fluid delivery locations along the fluid flow path. These parameters are then compiled and processed to create a specific, pre-determined sprinkler function. During operation of the sprinkler head and execution of the sprinkler function, these parameters will dictate the motion and fluid delivery of the sprinkler head to precisely deliver fluid along the pre-determined fluid flow path, thus irrigating the desired area. For instance, a sprinkler function may direct a sprinkler head to provide a fluid flow path that traces back and forth about the perimeter of an area, and then gradually scaling the fluid flow path just followed to irrigate the entire area. Any number of drive and flow parameters may be identified, recorded, and stored for a given sprinkler function. In addition, these drive and flow parameters may be assigned and compiled to created a sprinkler function that irrigates any given point, segment, line, or area within the arbitrarily-shaped area.

The present invention further features a programmable sprinkler head for use within an intelligent sprinkler irrigation system. In one embodiment, the programmable sprinkler head comprises (a) an inlet for receiving a fluid; (b) a valve component fluidly connected to the inlet for emitting the fluid; and (c) a multidirectional movement component configured to support and vector position the valve, and an associated fluid delivery point, according to a pre-determined sprinkler function to precisely deliver the fluid to at least a portion of the arbitrarily-shaped area.

In another embodiment, the programmable sprinkler head comprises (a) an inlet for receiving a fluid from a fluid source; (b) a nozzle fluidly connected to the inlet for dictating a particular type of emission of the fluid; and (c) a multidirectional movement component configured to support and vector position the nozzle according to a pre-determined sprinkler function to precisely deliver the fluid to at least a portion of the arbitrarily-shaped area.

The present invention further features a method for irrigating an arbitrarily-shaped area utilizing the system of the present invention. In one exemplary embodiment, the method comprises (a) identifying an area to be irrigated; (b) providing a fluid source configured to deliver a fluid under pressure; (c) providing a programmable sprinkler head having a vector positionable fluid delivery point for delivering the fluid according to a pre-determined sprinkler function; (d) connecting the programmable sprinkler head to the fluid source; (e) positioning the sprinkler head in a strategic position in relation to the area; and (f) operating the programmable sprinkler head to execute the pre-determined sprinkler function to precisely deliver the fluid to at least a portion of the arbitrarily-shaped area.

In order to follow a pre-determined fluid flow path to irrigate an arbitrarily-shaped area, both the movement of and the fluid delivery from the programmable sprinkler head may be programmed. In a typical operation, these two variables are coordinated to provide additional accuracy. To achieve a desired fluid delivery, the present invention further features a method for teaching the programmable sprinkler head one or more pre-determined sprinkler functions, wherein the teaching comprises learning and recording a plurality of drive parameters and flow parameters. Specifically, the method for teaching comprises (a) obtaining a programmable sprinkler head configured to deliver a fluid; (b) identifying an area to be irrigated; (c) positioning the programmable sprinkler head in a strategic location in relation to the area; (d) activating a teach mode within a computer system configured to program the programmable sprinkler head; and (e) assigning a plurality of drive parameters to a plurality of particular vector positions of the sprinkler head, respectively, to define a pre-determined sprinkler function for precise irrigation of at least a portion of said arbitrarily-shaped area, wherein the vector positions correspond to respective pre-determined and identified locations within the arbitrarily-shaped area; and (f) assigning at least one flow parameter to each of the vector positions, respectively, to coincide with the assigned drive parameters and to further define the pre-determined sprinkler function, wherein the flow parameters dictate the fluid delivery from the sprinkler head at each of the vector positions.

In the exemplary embodiments discussed herein, the present invention is operated within a computer environment that utilizes a computer system and one or more computer software programs to operate as intended. As such, the present invention features herein a computer program product for use within an intelligent sprinkler irrigation system, wherein the computer program product comprises a computer usable medium having computer readable program code means embodied therein for causing a programmable sprinkler head to deliver fluid according to a pre-determined sprinkler function. The computer readable program code means comprises (a) computer readable program code means for causing a computer to receive a series of input signals within a teaching mode that correspond to a particular fluid flow path to be followed when irrigating at least a portion of the area; (b) computer readable program code means for causing the computer to process the input signals to establish a pre-determined sprinkler function and to store the pre-determined sprinkler function on a memory storage device; (c) computer readable program code means for causing the computer to communicate the pre-determined sprinkler function to a programmable sprinkler head; and (d) computer readable program code means for causing the computer to actuate the programmable sprinkler head to precisely deliver a fluid to at least a portion of the area according to the pre-determined sprinkler function.

In one embodiment, the series of input signals comprise at least one, and more typically, a plurality of drive parameters to control the motion of the programmable sprinkler head. In another embodiment, the series of input signals comprise at least one, and more typically, a plurality of flow parameters that control the flow characteristics as delivered or emitted from the programmable sprinkler head.

In a related aspect, the present invention features a program storage device tangibly embodying a program of instructions executable by a computer system to perform the steps within a method for irrigating an arbitrarily-shaped area, the method comprising (a) receiving a series of input signals within a teaching mode that correspond to a particular fluid flow path to be followed when irrigating at least a portion of the area; (b) processing the input signals to establish a pre-determined sprinkler function; (c) storing the pre-determined sprinkler function on a memory storage device for selective retrieval; (d) communicating the pre-determined sprinkler function to a programmable sprinkler head; and (e) actuating the programmable sprinkler head to precisely deliver a fluid to at least a portion of the area according to the pre-determined sprinkler function.

The present invention further features a method in a computer system for irrigating an arbitrarily-shaped area, wherein the method comprises (a) controlling a teach mode, wherein a programmable sprinkler is taught a pre-determined sprinkler function corresponding to an identified area; (b) storing the pre-determined sprinkler function on a memory storage device; and (c) controlling the programmable sprinkler to precisely deliver a fluid to the area according to the pre-determined sprinkler function.

Finally, the present invention features a computerized system for irrigating an arbitrarily-shaped area, wherein the computerized system comprises (a) a fluid source comprising a pressurized fluid; (b) at least one programmable sprinkler head fluidly connected to the fluid source; (c) a learning component that learns and stores a pre-determined sprinkler function corresponding to a particular identified area to be irrigated; (d) a positioning component that vector positions the fluid delivery point during execution of the pre-determined sprinkler function; and (e) a fluid delivery component that controls the delivery of the fluid during execution of the pre-determined sprinkler function. The computerized system further comprising a switching component for selectively switching between a plurality of learned fluid flow paths.

Within the computer system of the present invention, the user is able to selectively control the programming and operation of the intelligent sprinkler irrigation system to create, modify, and execute a plurality of pre-determined sprinkler functions for any given arbitrarily-shaped area.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 7-B illustrates a detailed view of an exemplary valve component of the sprinkler head of FIG. 5-A;

FIGS. 12-A-12-C illustrate various side and top views of several different exemplary embodiments of deflector plates.

DETAILED DESCRIPTION OF EXEMPLARY EMBODIMENTS

Figure 1:
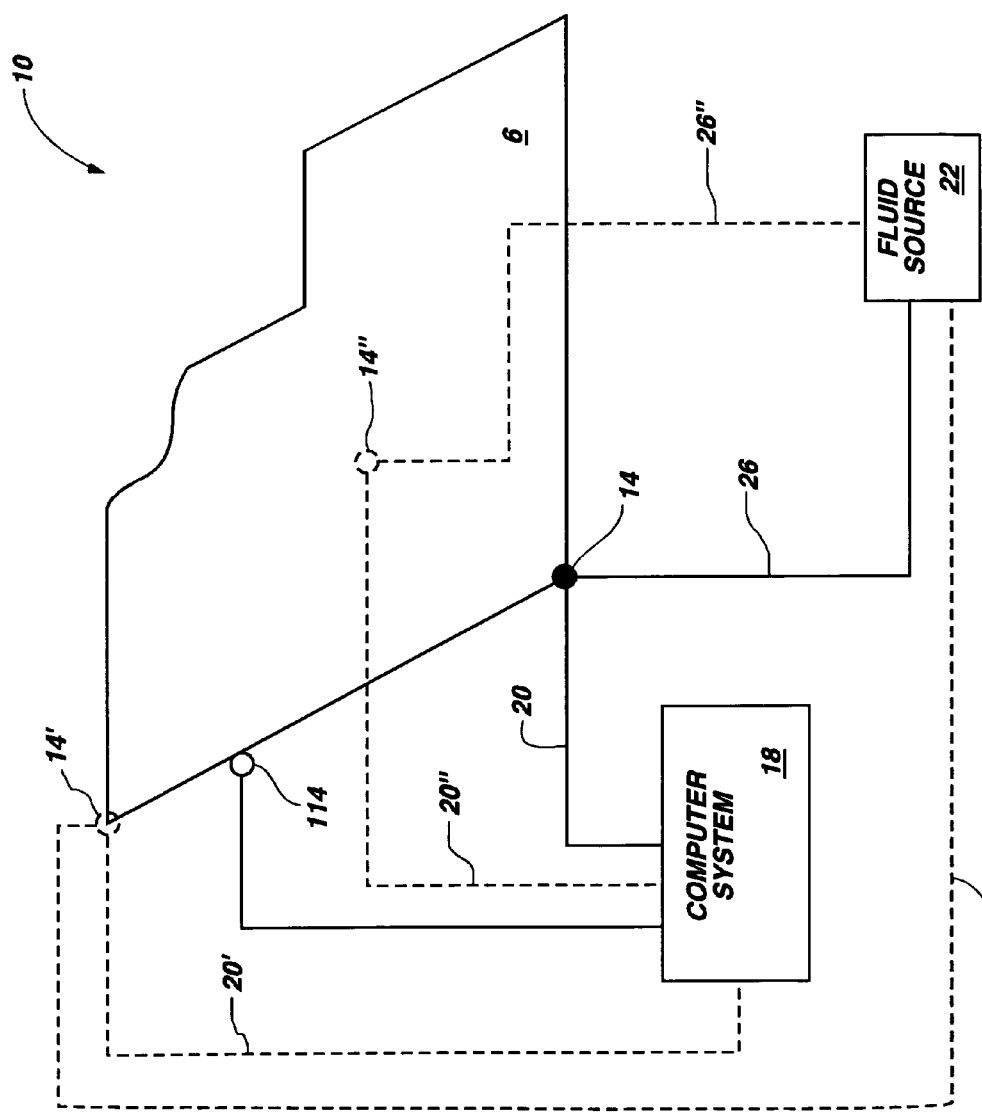
FIG. 1 illustrates a general layout of one exemplary intelligent sprinkler irrigation system.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 12-C, is not intended to limit the scope of the invention, as claimed, but is presented for purposes of illustration only and not limitation to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for irrigating an area, such as an arbitrarily-shaped area, using a unique intelligent sprinkler irrigation system, wherein, in one exemplary embodiment, a single programmable sprinkler head fluidly connected to a fluid source via a fluid delivery means is able to provide precise irrigation to any point, segment, or partial area within the arbitrarily-shaped area, as well as to the entire area. In practice, the present intelligent sprinkler irrigation system executes a pre-determined sprinkler function that strictly defines a fluid flow path to be delivered by the sprinkler head to achieve precise irrigation to a defined area. The intelligent sprinkler irrigation system may store and execute any number of sprinkler functions as necessary to execute a complete irrigation cycle for any given region of terrain. In addition, the intelligent sprinkler system will comprise various detection and feedback means or systems to modify, cancel, or delay an irrigation session.

To precisely deliver fluid to a pre-determined area or location, a pre-determined sprinkler function must first be created, thus making each pre-determined sprinkler function a learned function, wherein the sprinkler head may be programmed to deliver fluid along any desired and designated fluid flow path. Incidentally, the present invention provides users with a high degree of customization to meet various individual irrigation needs. Typically, to define or create a pre-determined sprinkler function, a particular fluid flow path must first be determined. In other words, a fluid flow path is pre-determined. Hence, each sprinkler function may be considered a pre-determined sprinkler function because its creation and operational parameters are based upon a pre-determined fluid flow path. This is not to say that the sprinkler function cannot be varied or altered, either automatically by program parameters, or manually.

The pre-determined sprinkler function is created during a teach mode, wherein various drive and flow parameters are assigned and recorded or stored that dictate the movement and flow delivery of the programmable sprinkler head during execution of the pre-determined sprinkler function.

Preliminarily, the phrase "fluid flow path," and similar phraseology, as used herein, shall be understood to mean the actual delivery path of the emitted fluid. The fluid flow path may comprise any number of linear or non linear segments, such as curved or spline segments, as well as a single point. The fluid flow path may comprise a one-dimensional path, or it may comprise a path that encompasses an area, or it may comprise a path that covers multiple or varying heights.

The phrase "sprinkler function" or "pre-determined sprinkler function," and similar phraseology, as used herein, shall be understood to mean one or more control parameters compiled and processed into a computer readable program product that defines a particular fluid flow path to be followed, wherein the program is executable by a computer to control a programmable sprinkler head to precisely deliver a fluid to a pre-determined area. The control parameters may include drive parameters and flow parameters, which may be operable with other controlling parameters, such as time, duration, and frequency of execution or operation control parameters, as well as others.

The phrase "drive parameter," and similar phraseology, as used herein, shall be understood to mean a control parameter operating within a pre-determined sprinkler function that comprises recorded or stored computer readable data corresponding to and representing a specific vector position of a programmable sprinkler head or one of its components. A series of drive parameters may be generated that function to dictate the movement or vector positioning of the sprinkler head, or one or more of its components, during execution of the pre-determined sprinkler function.

The phrase "flow parameter," and similar phraseology, as used herein, shall be understood to mean a control parameter operating within a pre-determined sprinkler function that comprises recorded or stored computer readable data corresponding to and representing one or more flow characteristics of a fluid delivery component of a programmable sprinkler head such as flow rate and geometry. Typically, a flow parameter will be coordinated with a drive parameter so that a fluid may be precisely delivered to a pre-determined point.

The phrase "vector position," and similar phraseology, as used as a noun herein, shall be understood to mean the specific orientation or coordinate location of the programmable sprinkler head and/or one or more of its components at a given instance within three-dimensional space. The vector position of the sprinkler head is designed to change, or may be reoriented, to follow a fluid flow path. Thus, the phrase "vector position" may also be understood as an action to mean the purposeful orienting of the programmable sprinkler head and/or one or more of its components in specific directions within three-dimensional space.

The present invention systems and methods provide several advantages over prior related sprinkler irrigation systems. First, a single sprinkler head may be programmed to provide coverage to any identified arbitrarily-shaped area along any pre-determined fluid flow path. Second, the need for extensive piping systems is substantially reduced or eliminated. Third, coverage overlap is significantly reduced, and in many cases, eliminated entirely as the number of sprinkler heads needed to sufficiently irrigate a given area is significantly reduced. This also helps to conserve water as the delivery of the water over the area is much more efficient. Fourth, multiple pre-determined sprinkler functions may be generated and stored, each of which may correspond to different irrigation needs, such as may arise under variable weather conditions or at different times of the day.

The advantages specifically recited herein are not meant to be limiting in any way, and should not be construed as such. Indeed, other advantages, benefits, and applications will be apparent and obvious to one ordinarily skilled in the art upon reading the detailed description and studying its accompanying drawings, as well as practicing one or more embodiments of the invention as disclosed and taught herein.

Referring now to FIG. 1, illustrated is a general layout of a intelligent sprinkler irrigation system according to one exemplary embodiment of the present invention. Specifically, intelligent sprinkler irrigation system 10 is shown having at least one programmable sprinkler head 14 strategically positioned in relation to an arbitrarily-shaped area 6. As shown, programmable sprinkler head 14 is positioned at a lower parameter portion of arbitrarily-shared area 6. However, as will be obvious to one ordinarily skilled in the art, programmable sprinkler head 14 may be positioned anywhere within or about arbitrarily-shaped area 6. For example, FIG. 1 further illustrates another programmable sprinkler head 14' optionally being positioned at a top left parameter portion of arbitrarily-shaped area 6. FIG. 1 also illustrates a programmable sprinkler head 14" positioned centrally within arbitrarily-shaped area 6.

The particular positioning of programmable sprinkler head 14 in relation to arbitrarily-shaped area 6 depends upon several factors, including, but not limited to, the shape of the area, the size of the area, layout of the area, and/or the coverage capabilities of the intelligent sprinkler irrigation system and the particular sprinkler head in question. As such, the positions or locations of programmable sprinkler head 14 shown in FIG. 1 are not to be construed as limiting in any way. Indeed, one ordinarily skilled in the art will recognize a significant advantage of the present invention includes the option for many different locations of the programmable sprinkler head 14 in relation to arbitrarily-shaped area 6.

FIG. 1 also illustrates computer system 18 operably connected to or in communication with programmable sprinkler head(s) 14. In one exemplary embodiment, computer system 18 is located in a location remote from that of programmable sprinkler head 14, as shown in FIG. 1, such as in a garage or shed. However, the present invention also contemplates other configurations or arrangements for computer system 18. In another exemplary embodiment, computer system 18 is contained and supported within programmable sprinkler head 14. In this arrangement, the user interface or control system may also be supported within or on the sprinkler head, or it may comprise a removable device that operably connects to the sprinkler head as needed, such as to program the sprinkler head during a teach mode. In the embodiment where computer system 18 is located in a location remote from programmable sprinkler head 14, computer system 18 is operably connected to programmable sprinkler head 14 via a wired 20 or wireless connection, each of which are commonly known in the art. The particulars of computer system 18 are explained in greater detail below.

FIG. 1 also illustrates fluid source 22. Fluid source 22 is fluidly connected to programmable sprinkler head 14 via deliver means 26. Delivery means 26 is typically a conduit-like member or structure, such as a pipe or a hose that functions to facilitate the transfer of a fluid from fluid source 22 to programmable sprinkler head 14. Moreover, fluid source 22 typically comprises any type of system or device capable of providing a fluid under pressure. For instance, fluid source 22 may comprise a city or county water supply to which delivery means 26 may be connected for providing a fluid to programmable sprinkler head 14, a pump, a well, or any others.

FIG. 1 further illustrates a sensor 114 located or positioned adjacent the area to be irrigated. The sensor 114, which may be any type of emissivity sensor, wind sensor, rain sensor, or other type of sensor, is intended to communicate with the computer to provide real-time information about the area to be irrigated. The computer is able to collect or gather this information to vary, delay, or cancel the sprinkler function based on pre-defined parameters or threshold levels stored in the computers memory. For example, if the wind is gusting at the time a sprinkler session is to begin, the sensor will detect this, relay the wind speed and direction to the computer, and the computer will modify, delay, or cancel the sprinkler function based on the previously stored parameters.

As FIG. 1 illustrates, arbitrarily-shaped area 6, despite its shape, may be irrigated using a single programmable sprinkler head 14 to irrigate all or a portion of its area. This is true even though arbitrarily-shaped area 6 comprises various linear and nonlinear segments. While a single programmable sprinkler head may be utilized, circumstances are foreseeable where a plurality of programmable sprinkler heads would provide the most efficient irrigation of an area. As such, it is contemplated by the present invention, and one ordinarily skilled in the art will recognize, that any number of programmable sprinkler heads may be utilized to irrigate different areas (e.g., as part of a larger area). The ability for a single programmable sprinkler head or a plurality of programmable sprinkler heads to irrigate all or a portion of an arbitrarily-shaped area as shown in FIG. 1 is described in greater detail below.

Figure 2:
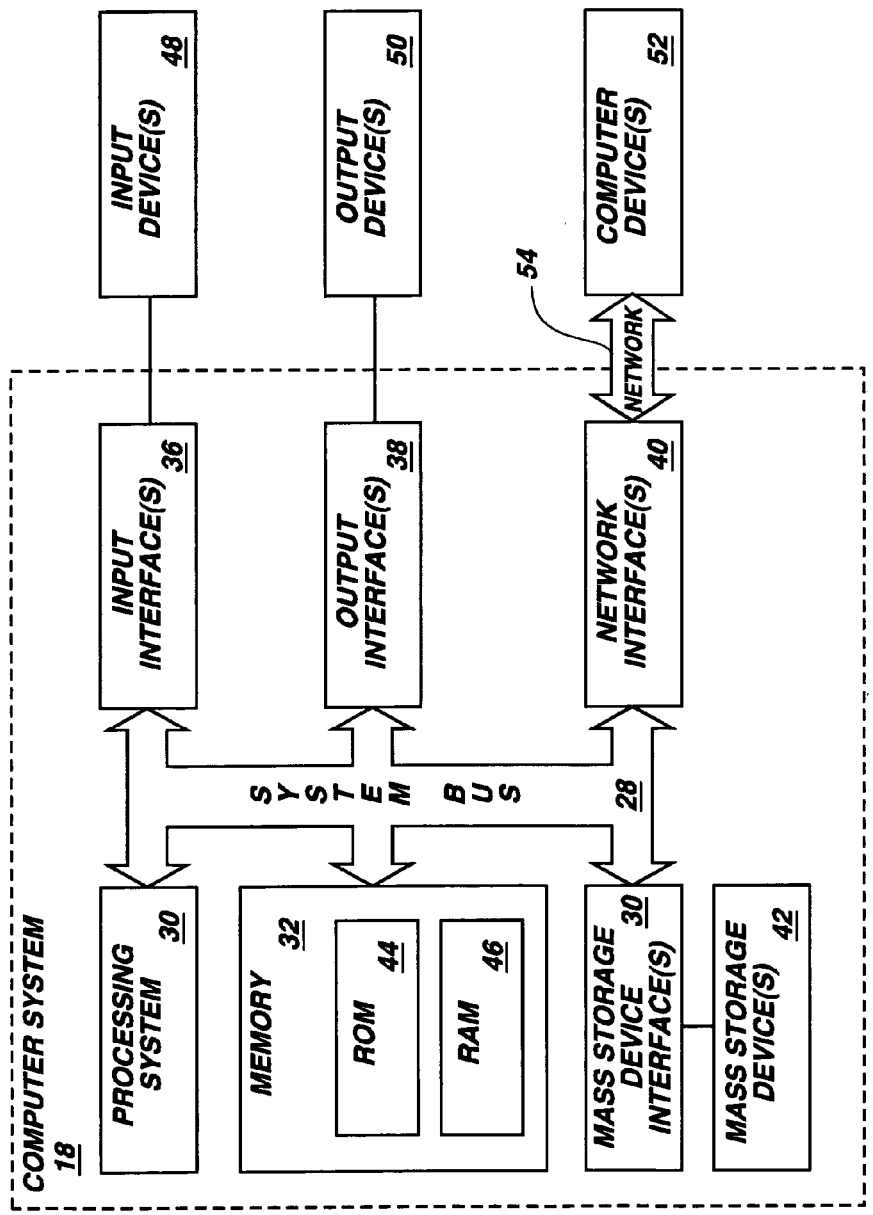
FIG. 2 illustrates a general block diagram of an exemplary computer system used to control and operate an intelligent sprinkler irrigation system.

With reference to FIG. 2, illustrated is a general block diagram of an exemplary computer system used to control and operate the intelligent system. FIG. 2 and the corresponding discussion is intended to provide a general description of a suitable operating environment in which the invention may be implemented. One skilled in the art will appreciate that the invention may be practiced by a variety of computing devices and in a variety of system configurations, including in a networked configuration, as will be further explained below.

Embodiments of the present invention embrace one or more computer readable media, wherein each medium may be configured to include or includes thereon data or computer executable instructions for manipulating data. The computer executable instructions include data, data structures, objects, programs, routines, or other program modules that may be accessed by a processing system, such as one associated with a general-purpose computer capable of performing various different functions or one associated with a special-purpose computer capable of performing a limited number of express functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system and that is known or may become known in the art.

A representative computer system for implementing the invention includes computer device 18, which may be a general-purpose or special-purpose computer. For example, computer device 18 may be a personal computer, a notebook computer, a personal digital assistant ("PDA") or other handheld device, a workstation, a minicomputer, a mainframe, a supercomputer, a multi-processor system, a network computer, a processor-based consumer electronic device, or the like.

Computer device 18 may or may not include system bus 28. If so, system bus 28 may be configured to connect various components thereof and to enable data to be exchanged between two or more components. System bus 28 may include one of a variety of bus structures including a memory bus or memory controller, a peripheral bus, or a local bus that uses any of a variety of bus architectures. Typical components connected by system bus 28 include processing system 30 and memory 32. Other typical computer components may include one or more mass storage device interfaces 34, input interfaces 36, output interfaces 38, and network interfaces 40. Components unique to the present invention that may be connected by bus 28 to those just mentioned or to one another include, a valve component and a multi-directional movement component, each of which will be discussed below.

Processing system 30 includes one or more processors, such as a central processor and optionally one or more other processors designed to perform a particular function or task, such as the learning and storing of a pre-determined sprinkler function during a teach mode. It is typically processing system 30 that executes the instructions provided on computer readable media, such as on memory 32, a magnetic hard disk, a removable magnetic disk, a magnetic cassette, an optical disk. Processing system 30 may also be operable with a remote computer device 52 through a communication connection 40, which remote computer device may also be a computer readable media such as a remote memory storage device.

Memory 32 includes one or more computer readable media that may be configured to include or includes thereon data or instructions for manipulating data, and may be accessed by processing system 30 through system bus 28. Memory 32 may include, for example, ROM 44, used to permanently store information, and/or RAM 46, used to temporarily store information. ROM 44 may include a basic input/output system ("BIOS") having one or more routines that are used to establish communication, such as during start-up of computer device 18. RAM 46 may include one or more program modules, such as one or more operating systems, application programs, and/or program data.

One or more mass storage device interfaces 34 may be used to connect one or more mass storage devices 42 to system bus 28. The mass storage devices 42 may be incorporated into or may be peripheral to computer device 18 and allow computer device 18 to retain large amounts of data. Optionally, one or more of the mass storage devices 42 may be removable from computer device 18. Examples of mass storage devices include hard disk drives, magnetic disk drives, tape drives and optical disk drives. A mass storage device 42 may read from and/or write to a magnetic hard disk, a removable magnetic disk, a magnetic cassette, an optical disk, or another computer readable medium. Mass storage devices 42 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 36 may be employed to enable a user to enter data and/or instructions to computer device 18 through one or more corresponding input devices 48. Examples of such input devices include a hand held or portable control means for controlling the computer system. Examples of various control means include, but are not limited to, a keyboard, a touch pad, a mouse, a trackball, a light pen, a stylus, or other data input device. One particular type of input device that will be useful to the present invention is various sensors configured to detect, monitor, and transmit data to the computer system 18. The information compiled may be processed to affect the sprinkler function as will be discussed herein. The information may also be used to provide feedback to the computer system 18 to again affect the sprinkler function. It is intended that the use of sensors, in one or more forms, be applicable to all embodiments of the present invention despite sensors not being specifically discussed in each embodiment. Similarly, examples of input interfaces 36 that may be used to connect the input devices 48 to the system bus 28 include a serial port, a parallel port, a game port, a universal serial bus ("USB"), a firewire (IEEE 1394), a type of proprietary port, a wireless transmission, or any other known interface.

One or more output interfaces 38 may be employed to connect one or more corresponding output devices 50 to system bus 28. Examples of output devices 50 include a monitor or display screen and the like. A particular output device 50 may be integrated with or peripheral to computer device 18. Examples of output interfaces 38 include a parallel port and the like.

The present invention may also be practiced in a network environment, such as where a single computer controls multiple sprinkler heads at one or more independent locations. One or more network interfaces 40 enable computer system 18 to exchange information with one or more other local or remote computer systems, illustrated as computer system(s) 52, via a network 54 that may include hardwired and/or wireless links. Examples of network interfaces include a network adapter for connection to a local area network ("LAN") or a modem, wireless link, or other adapter for connection to a wide area network ("WAN"), such as the Internet. The network interface 40 may be incorporated with or peripheral to computer device 18. In a networked system, accessible program modules or portions thereof may be stored in a remote memory storage device. Furthermore, in a networked system computer device 18 may participate in a distributed computing environment, where functions or tasks are performed by a plurality of networked computer devices.

Figure 3:
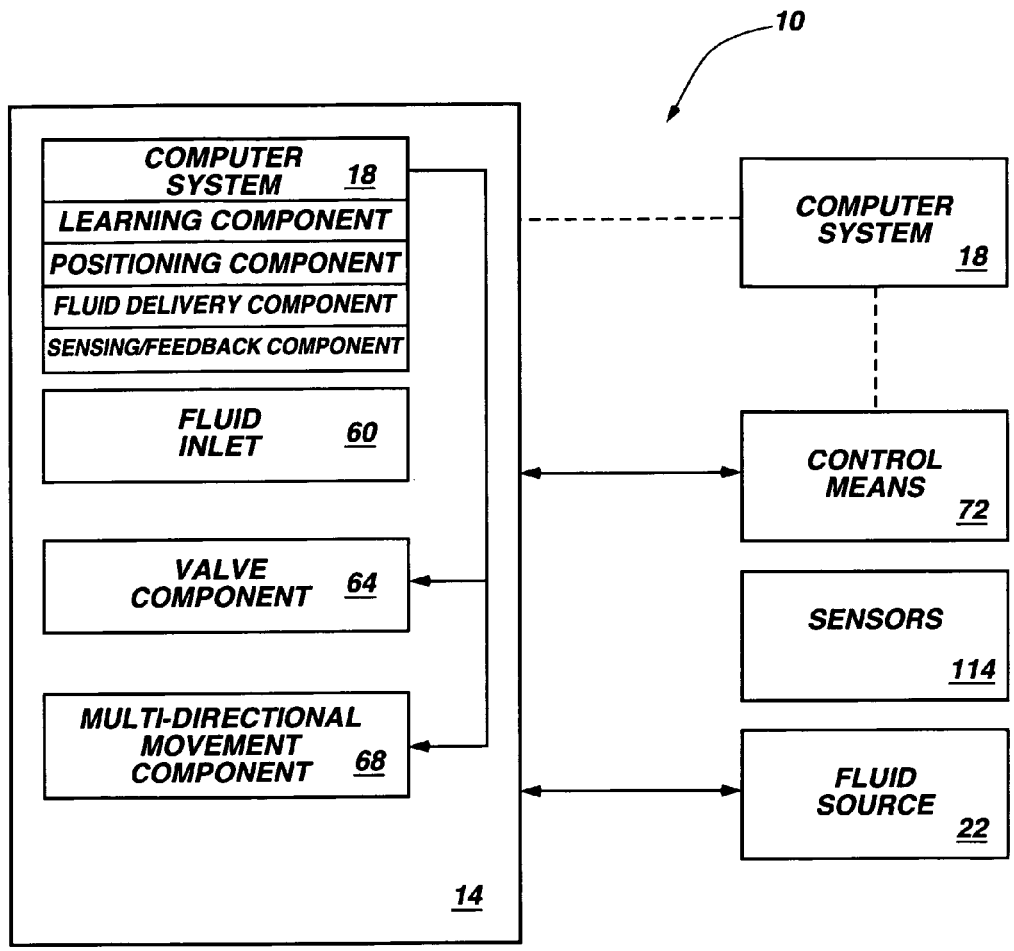
FIG. 3 illustrates a block diagram of one exemplary embodiment of an intelligent sprinkler irrigation system.

With reference to FIG. 3, shown is a general block diagram of an exemplary intelligent sprinkler irrigation system 10. In this embodiment, intelligent sprinkler irrigation system 10 comprises a programmable sprinkler head 14. Within programmable sprinkler head 14 are several components, namely a computer system 18, a fluid delivery component 60, a valve component 64, and a multi-directional movement component 68. As discussed above, computer system 18 may be contained within programmable sprinkler head 14, as shown in FIG. 3, or it may reside in a location remote from that of programmable sprinkler head 14, as illustrated by the dotted lines in FIG. 3. Computer system 18 is essentially the driving force or driving component of intelligent sprinkler irrigation system 10. In addition to the elements discussed above in relation to FIG. 2, computer system 18 also comprises a learning component, a positioning component, a fluid delivery component, and a sensing and/or feedback component.

The learning component of computer system 18 allows computer system 18 to learn and store a pre-determined sprinkler function corresponding to a particular identified area to be irrigated. More precisely, the learning component of computer system 18 allows a specific and pre-determined area to be irrigated according to a pre-determined fluid flow path, which will largely depend upon the arbitrarily shaped area to be irrigated. Once an arbitrarily shaped area is identified and a corresponding fluid flow path determined, the learning component of computer system 18 provides the means whereby programmable sprinkler head 14 is programmed. Stated differently, once a fluid flow path within an arbitrarily shaped area is determined, a teach mode within the learning component may be activated to program programmable sprinkler head 14 to follow the pre-determined fluid flow path. During the teach mode, a series of drive and/or flow parameters are created or defined that dictate both the movement and the flow delivery of the sprinkler head at any particular location. For example, a user may manually rotate the sprinkler head through a sequence of positions while concurrently modifying the flow rate, geometry of the flow path and rate of rotation. These movements and settings become the drive and flow parameters associated with the watering sequence.

In another embodiment for providing a teach mode, the system may comprise a mapping architecture, utilizing a mapping program for programming and controlling the sprinkler heads and the irrigation. In this embodiment, a map of the area or areas to be irrigated may be input into or otherwise defined in the computer for viewing by a user on a display screen. The map of the area may comprise specific coordinates readable by the computer, which coordinates may correspond to boundaries, specific areas or locations, elevations, and other characteristics of the area to be irrigated. The mapping architecture may further identify and display the various sprinkler heads in operation and available for manipulation and programming. To program the sprinkler heads, the user simply selects the appropriate sprinkler head and then inputs the desired control parameters using the coordinates in the mapping program that correspond to physical characteristics of the area to be irrigated. Alternatively, the mapping program may comprise a tracing element, wherein the user selects a desired sprinkler head and then traces its path along the map displayed on the display screen using a light pen or other similar type of electronic input device. In essence, the mapping program will provide the user the ability to visually see the areas to be irrigated, the sprinkler heads in operation in the areas. The mapping program will also provide the user with the ability to control the various sprinkler heads using the map.

These drive and flow parameters are compiled into a pre-determined sprinkler function that is stored on a memory storage device and that functions to control the sprinkler head to deliver fluid along the pre-determined fluid flow path as desired. For instance, the predetermined sprinkler function may control the sprinkler head to deliver fluid about a fluid flow path, wherein the fluid flow path and associated fluid deliver traces the perimeter of an area, including any linear or non linear segments and including those oriented in any manner with respect to one another. In another example, the predetermined sprinkler function may control the sprinkler head to deliver fluid about a fluid flow path, wherein the fluid delivery irrigates only an identified segment within the arbitrarily shaped area. As will be apparent, a pre-determined sprinkler function may be generated and stored to control the sprinkler head to deliver fluid about any designated or pre-determined fluid flow path in relation to the arbitrarily shaped area without limitation.

One significant benefit of the present invention intelligent sprinkler irrigation system over prior related sprinkler irrigation systems is the ability to precisely deliver variable quantities of fluid to any arbitrarily shaped area. By "precisely," it is meant that fluid may be directed or delivered to any identified point and to any succession of points within an area, limited only by system constraints, such as maximum fluid emission distance. Thus, the arbitrarily shaped area may comprise any shape as the fluid flow path may comprise any directional path, as well as including a single point. By assigning one or more parameters and compiling this into a pre-determined sprinkler function, a fluid flow path may consist of either linear or non-linear segments, or both.

As indicated, computer System 18 further comprises a positioning component. The positioning component functions to control the movement of programmable sprinkler head 14, or any one of its components. The ability to irrigate an arbitrarily shaped area comprising various linear and non-linear segments, or to provide irrigation to a particular point or segment within an arbitrarily shaped area, depends upon the movement and flow capabilities of programmable sprinkler head 14. As such, programmable sprinkler head 14 comprises a multi-directional movement component 68 that effectively vector positions a fluid delivery point of programmable sprinkler head 14, including both lateral and elevational movements. Multi-directional movement component 68 is controlled by the positioning component of computer system 18. To vector position programmable sprinkler head 14 according to the pre-determined sprinkler function generated and recorded by the learning component.

Computer system 18 further comprises a fluid delivery component that controls the manner in which a fluid is emitted or delivered from programmable sprinkler 14. Specifically, the fluid delivery component controls the flow parameters defined within the pre-determined sprinkler function. The fluid delivery component effectively controls at least one of the velocity of the fluid, the volume of the fluid, the pressure within the fluid, the direction the fluid is emitted, the geometric shape of the fluid delivery, and the rate at which the fluid is emitted. The fluid delivery component typically operates in conjunction with the positioning component to allow programmable sprinkler head 14 to precisely deliver fluid along the pre-determined fluid flow path according to the pre-determined sprinkler function. In one aspect, the fluid delivery component controls valve component 64 within programmable sprinkler head 14. Thus, the fluid being emitted from valve component 64 is regulated by the fluid delivery component regulating the opening and closing of valve component 64. In another aspect, programmable sprinkler head 14 may comprise a nozzle in place of valve component 64. In this embodiment, the fluid delivery component may be made to regulate the velocity, the pressure, the geometry of the nozzle opening, and/or the flow rate of the fluid coming into programmable sprinkler head 14 from fluid source 22. In each of these exemplary embodiments, as well as others, the fluid delivery component of computer system 18 is provided to control at least one characteristic or aspect of the fluid being emitted from programmable sprinkler head 14 during execution of the pre-determined sprinkler function. Part of this control includes compensating for sensed fluctuations in fluid flow characteristics.

Computer system 18 still further comprises a sensing and/or feedback component capable of sensing certain environmental conditions, area emissivity, and other things for the purpose of affecting the sprinkler function. This sensing component receives its information from strategically placed sensors 114 designed to collect information or data that would affect an irrigation session. Indeed, based on the information received by the sensors, the sprinkler function may be modified, delayed, or canceled altogether. The sensing and feedback component is discussed in greater detail below.

Figure 6:
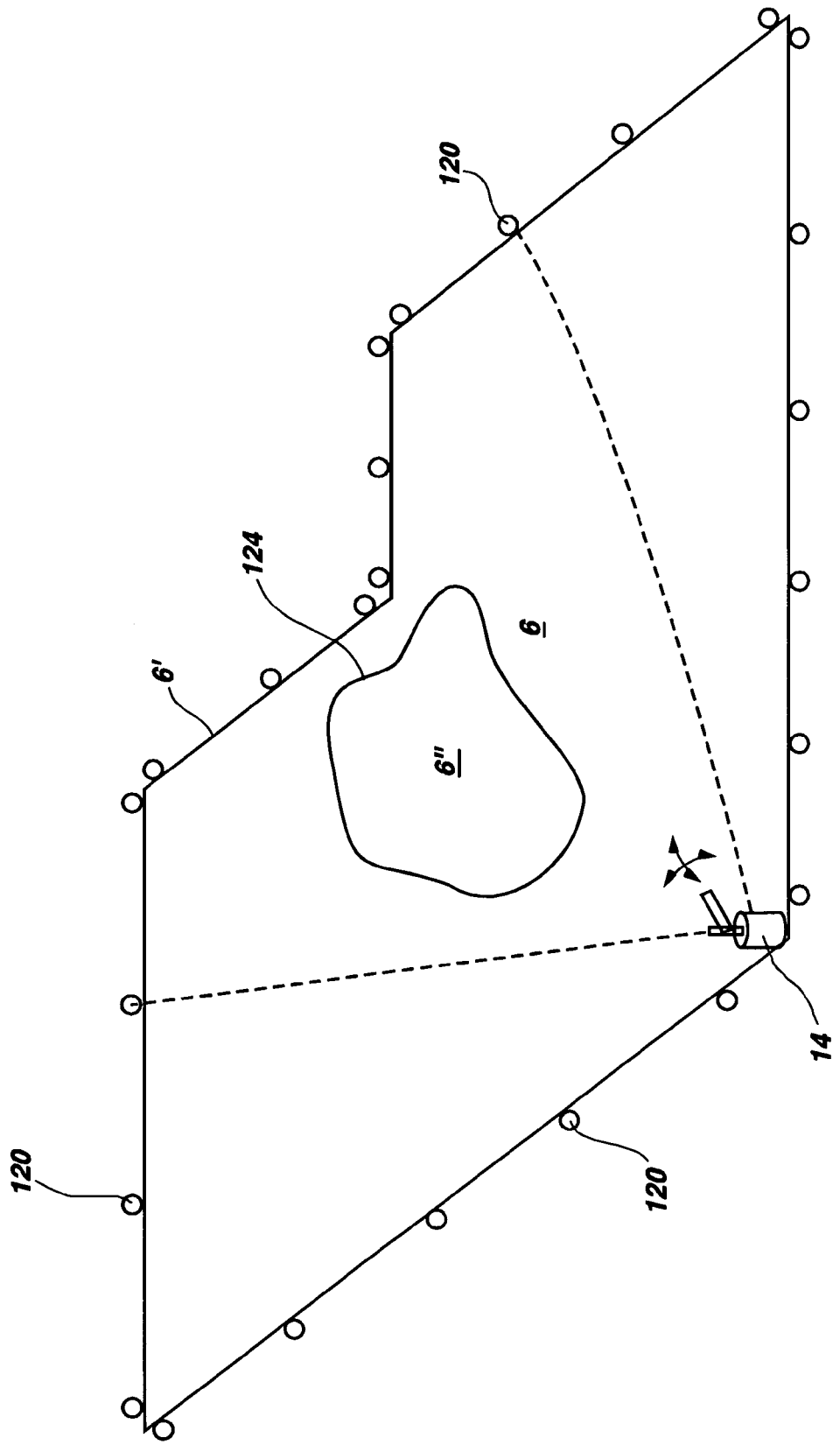
FIG. 6 illustrated is an intelligent sprinkler irrigation system according to another exemplary embodiment of the present invention.

Multi-directional movement component 68 essentially comprises the various structural elements of programmable sprinkler head 14. Multi-directional movement component 68 may comprise any known device or system capable of vector positioning a fluid delivery point of programmable sprinkler head 14. One exemplary multi-directional movement component 68 is described below with respect to FIG. 6. FIG. 6 also illustrates an exemplary valve component 64 that may be used to emit fluid from programmable sprinkler head 14.

FIG. 3 also illustrates control means 72 that interfaces with and controls computer system 18. Control means 72 is a computer system that allows a user to operate the intelligent sprinkler irrigation system of the present invention. In one aspect, control means 72 may be integrated with computer system 18 into a single unit. In another aspect, control means 72 may comprise an independent unit that is removably and operably connected to computer system 18.

Figure 4:
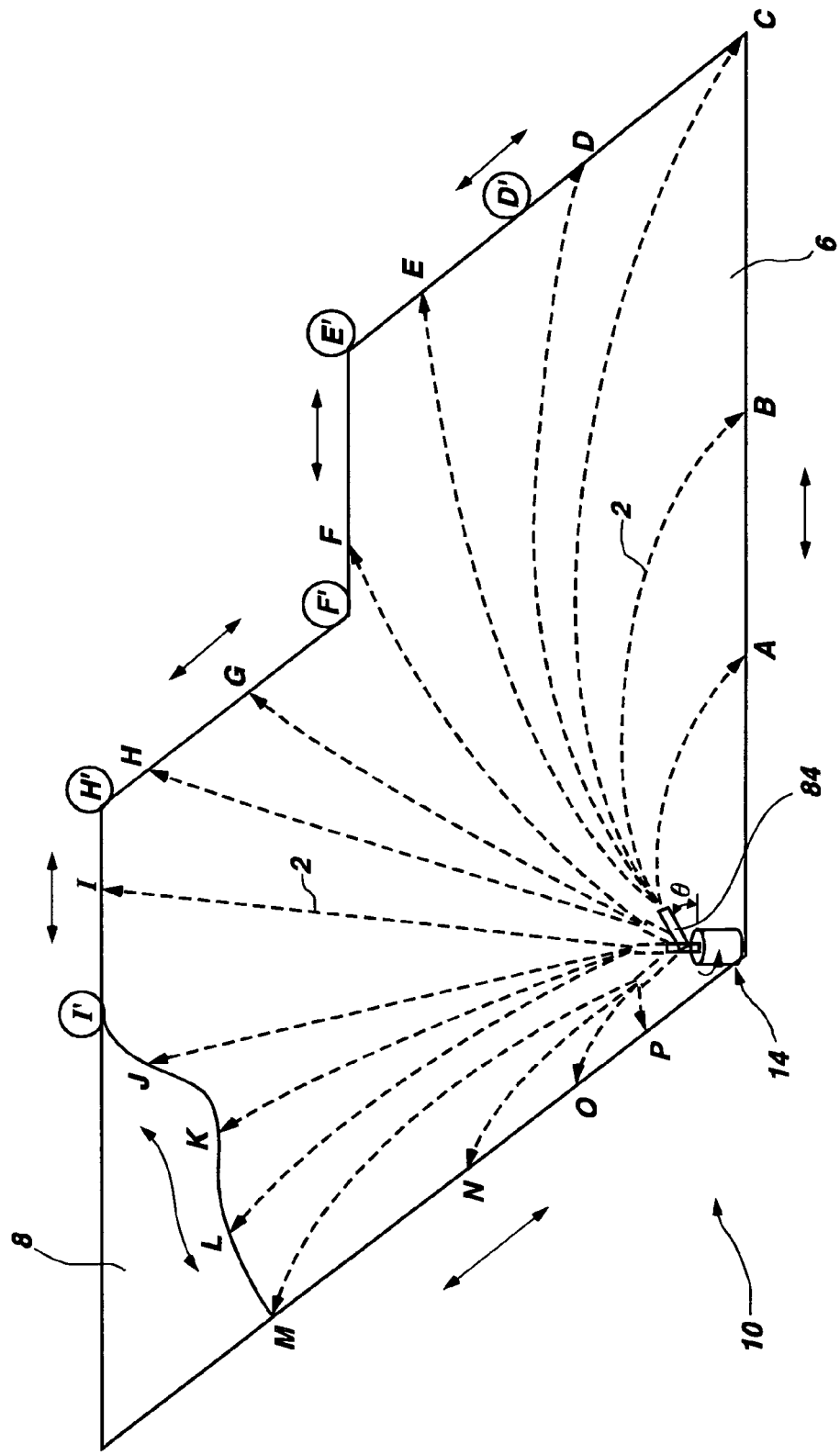
FIG. 4 illustrates an exemplary layout of an arbitrarily-shaped area having a plurality of locations identified about a perimeter of the area representing a pre-determined sprinkler function.

With reference to FIG. 4, illustrated is an exemplary layout of an arbitrarily shaped area 6. Arbitrarily shaped area 6 comprises a plurality of linear segments, as well as a curved segment, arranged to enclose an area as shown. FIG. 4 also illustrates a programmable sprinkler head 14 strategically positioned in a corner of arbitrarily shaped area 6. As can be seen, programmable sprinkler head 14 emits a fluid 2 (illustrated by dotted lines) to one or more, and typically a plurality, of precise locations within or about arbitrarily shaped area 6. These precise locations are identified in FIG. 4 as letters A through P, which each correspond to various locations about a fluid flow path designed to irrigate arbitrarily shaped area 6. Upon execution of the predetermined sprinkler function programmed to execute the illustrated fluid flow path, programmable sprinkler head 14 is first vector positioned, and its flow characteristics controlled, to precisely deliver fluid 2 to the location marked as point A within arbitrarily shaped area 6. Based upon the different control parameters used to dictate the duration of time fluid is to be delivered to point A, programmable sprinkler head 14 then proceeds to move or vector position so that fluid is now delivered to point B along the fluid flow path. In order to properly deliver fluid to precisely to point B, one or both of the multidirectional movement components and the flow characteristics are altered or modified relative to those required to deliver fluid to point A. Indeed, the multidirectional movement component of sprinkler head 14 may be varied while the flow characteristics are held constant to deliver fluid to point B. Conversely, the flow characteristics of programmable sprinkler head 14 may be varied while the multidirectional movement component is held constant to precisely deliver fluid to point B. Obviously, however, both of these may be varied in relation to one another so that programmable sprinkler head 14 may precisely deliver fluid to point B. In each of these cases, the goal is to transition the delivery of fluid 2 from point A to point B along the predetermined fluid flow path. The transition of fluid delivery from point A to point B may be abrupt or smooth. Whether the transition is abrupt is smooth will largely depend upon the particular program used to create the predetermined sprinkler function. A more complex alternative function would be to define end points of straight segments AC, CE', E'F', E'H'; & H'I' and then vary the drive parameters in a linear manner to track the line segment with fluid delivery other variations for programming will be envisioned by the skilled in the art.

Returning to FIG. 4, points A and B are pre-determined locations about the particular fluid flow path to be followed within or about arbitrarily shaped area 6 that have assigned to them the various drive and flow parameters input into the system to generate the pre-determined sprinkler function that controls the programmable sprinkler head to deliver fluid to these locations during operation of the system. These points may be spaced as close or as far apart as needed or desired to provide accurate irrigation of arbitrarily shaped area 6 along the fluid flow path. Each point A through B essentially represents a different fluid delivery point along the predetermined fluid flow path. Thus, after delivering fluid to point A programmable sprinkler head 14 adjusts to deliver fluid to point B based on the defined drive and flow parameters of the predetermined sprinkler function currently being executed. This process continues from point B to point C, and from point C to point D, and so on until fluid 2 is accurately delivered to the last point (illustrated as point P) along the predetermined fluid flow path. Once this last point is reached, the predetermined sprinkler function may direct programmable sprinkler head 14 to cease delivering fluid and shut down, or continue delivering fluid to arbitrarily shaped area 6.

Typically, an area will require irrigation for an extended duration of time. As such, when fluid delivery at point P is reached, the predetermined sprinkler function will include instructions for programmable sprinkler head 14 to either repeat fluid delivery about the fluid flow path again beginning at point A and proceeding to point P a number of times until the time for irrigation is completed, or the predetermined sprinkler function may cause programmable sprinkler head 14 to move and deliver fluid backwards from point P to point A along the same fluid flow path. This back and forth fluid delivery may be repeated as often as desired during the time arbitrarily shaped area 6 is to be irrigated.

FIG. 4 illustrates how programmable sprinkler head 14 is able to deliver fluid in a precise manner about a pre-determined fluid flow path tracing the perimeter of arbitrarily shaped area 6. This is true even where a non-irrigated area 8 exists. Non-irrigated area 8 may comprise a sidewalk, a flower bed, a structure, or any other area or object not requiring irrigation. The pre-determined sprinkler function is able to irrigate around these areas as needed.

Figure 5:
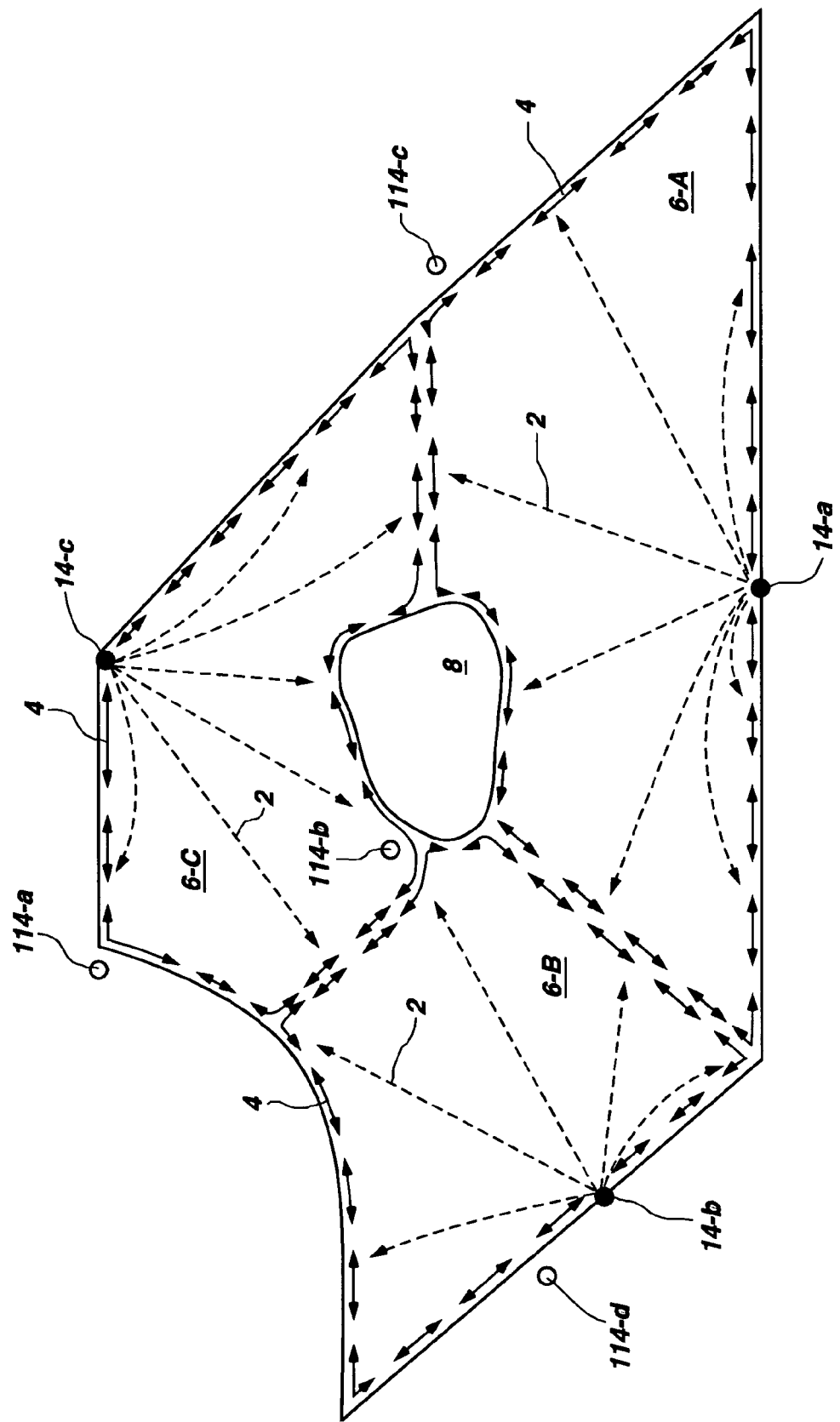
FIG. 5 illustrates an exemplary layout of multiple arbitrarily-shaped areas within a larger area, as well as a plurality of programmable sprinkler heads utilized to irrigate these areas.

FIG. 5 illustrates an exemplary layout of multiple arbitrarily shaped areas within a larger area, as well as a plurality of programmable sprinkler heads utilized to irrigate each of these arbitrarily shaped areas. Specifically, FIG. 5 illustrates a large area comprising programmable sprinkler heads 14-A, 14-B, and 14-C, each delivering fluid to a corresponding arbitrarily shaped area, namely area 6-A, 6-B, and 6-C, respectively. Programmable sprinkler head 14-a functions to deliver fluid 2 about a pre-determined fluid flow path about arbitrarily shaped area 6-A according to a pre-determined sprinkler function defining the pre-determined fluid flow path. Likewise, programmable sprinkler head 14-b functions to deliver fluid 2 about arbitrarily shaped area 6-B according to its own pre-determined sprinkler function. The same is also true for programmable sprinkler head 14-c and fluid 2 that it delivers to arbitrarily area 6-C.

As is evident from FIG. 5, arbitrarily shaped areas 6-A, 6-B, and 6-C each differ in their respective geometries. One advantage of the present invention is the ability for programmable sprinkler head 14 to deliver fluid to any arbitrarily shaped area, such as those illustrated in FIG. 5. Therefore, no matter what area is to be irrigated, including areas having multiple levels, one or more programmable sprinkler heads may be strategically positioned in relation to a respective area to be irrigated to achieve precise fluid delivery within or about that area. FIG. 5 also illustrates non-irrigated area 8 and how each of the programmable sprinkler heads 14-a, 14-b, and 14-c each combine to deliver fluid to areas immediately adjacent non-irrigated area 8. In other words, irrigation is accomplished while avoiding those areas that are preferably not irrigated. Thus, the boundary separating non-irrigated area 8 from areas 6-A, 6-B, and 6-C is defined and known by each of the sprinkler heads 14-a, 14-b, and 14-c. FIG. 5 also illustrates how a pre-determined fluid flow path can be directly adjacent another pre-determined fluid flow path such that irrigation overlap is eliminated or significantly reduced. However, some overlap may be necessary or desirable.

In an alternative embodiment, previously identified non-irrigated area 8 may actually be defined as an area that requires increased irrigation, for whatever reason, rather than an area not to be irrigated. Thus, in the teach mode, the irrigation system and the sprinkler heads therein, would be used to supply an increased amount of water to area 8. In the embodiment shown in FIG. 5, one or all of sprinkler heads 14-a, 14-b, and 14-c may be used to supply water to area 8.

Since an increased amount of water would be needed, the duration for delivering the stream of water may be increased, or the flow may be increased, or both. Such parameters would be programmed into the computer system and would be defined within the sprinkler function.

As one skilled in the art will recognize, there may be a plurality of defined areas within a larger defined area that require different levels or amounts of irrigation. Each of these may be learned and programmed to create a corresponding sprinkler function capable of supplying the correct supply of water to all areas. For instance, area 6-B may require more or less water than area 6-C, which may require more or less water than area 6-A, and so on. As such, the present invention contemplates the ability to deliver non-uniform water to any area or point.

With reference to FIG. 6, illustrated is an intelligent sprinkler irrigation system according to another exemplary embodiment of the present invention. In this embodiment, the intelligent sprinkler system comprises a programmable sprinkler head 14 that is similar to the ones described herein. Generally, speaking, the sprinkler head 14 comprises an inlet (not shown) for receiving fluid from a fluid source and a fluid directory device that is fluidly connected to the inlet for dictating and delivering a particular type of emission of fluid. The fluid directory device may be in the form of a nozzle-type device or a sleeve valve-type device, or any other known fluid delivery system or device. The sprinkler head 14 also comprises an on-board computer processor (not shown) that is configured to execute a pre-determined sprinkler function. Also, the sprinkler head 14 comprises a multidirectional movement component configured to support and vector position the fluid directory device according to the pre-determined sprinkler function to precisely deliver fluid to at least a portion of an arbitrarily-shaped area. Again, the multi-directional movement component is similar to those discussed herein.

As can be seen the intelligent sprinkler system comprises a plurality of sensors 120 strategically located or positioned about the perimeter 6' of the arbitrarily-shaped area 6. Sensors 120 may comprise any type of sensor capable of detecting fluid delivery or emission thereon, such as force sensors. The sensors function to define one or more irrigation boundaries, in this case the several perimeter boundaries of the arbitrarily-shaped area 6.

The programmable sprinkler head is designed to emit fluid along a path until the fluid emission contacts a sensor 120. Upon detecting water emission, the sensors 120 communicate this in data form to the computer processor located on-board the programmable sprinkler head, at which time the computer processor processes the data to identify and learn the boundary at which the sensor 120 is located. In other words, the sensor tells the sprinkler head 14 not to irrigate beyond that location. Repeatedly doing this, a sprinkler function may be defined that is based on the communicated data. The sprinkler function allows the sprinkler head to operate to irrigate the arbitrarily-shaped area based on the learned information and defined sprinkler function for future irrigation sessions.

In an alternative embodiment, sensors 120 may comprise optical sensors or markers. In this embodiment, the programmable sprinkler head 14 comprises an optical signal transceiver configured to output an optical signal to be received by the optical sensors, and to receive the optical signal as returned by the optical sensors. The data will be processed by the on-board computer system of the sprinkler head to define the sprinkler function for future irrigation. In addition, with optical sensors, the computer will be able to receive data from multiple optical sensors to define an area to be irrigated. For example, optical data from three individually positioned sensors located apart from one another will allow the computer to define an irrigation area.

In still another alternative embodiment, a sensing cable 124 may be positioned to define an area to be irrigated. In the embodiment shown, the area 6'' is defined by the sensing cable 124. The sprinkler head 14 is configured to irrigate either within or without that area in a similar manner as described above with respect to sensors 120. The sensing cable 124 is designed to provide flexibility to the present invention irrigation system by allowing a user to arbitrarily create and define an area of irrigation or non-irrigation.

Figure 7:
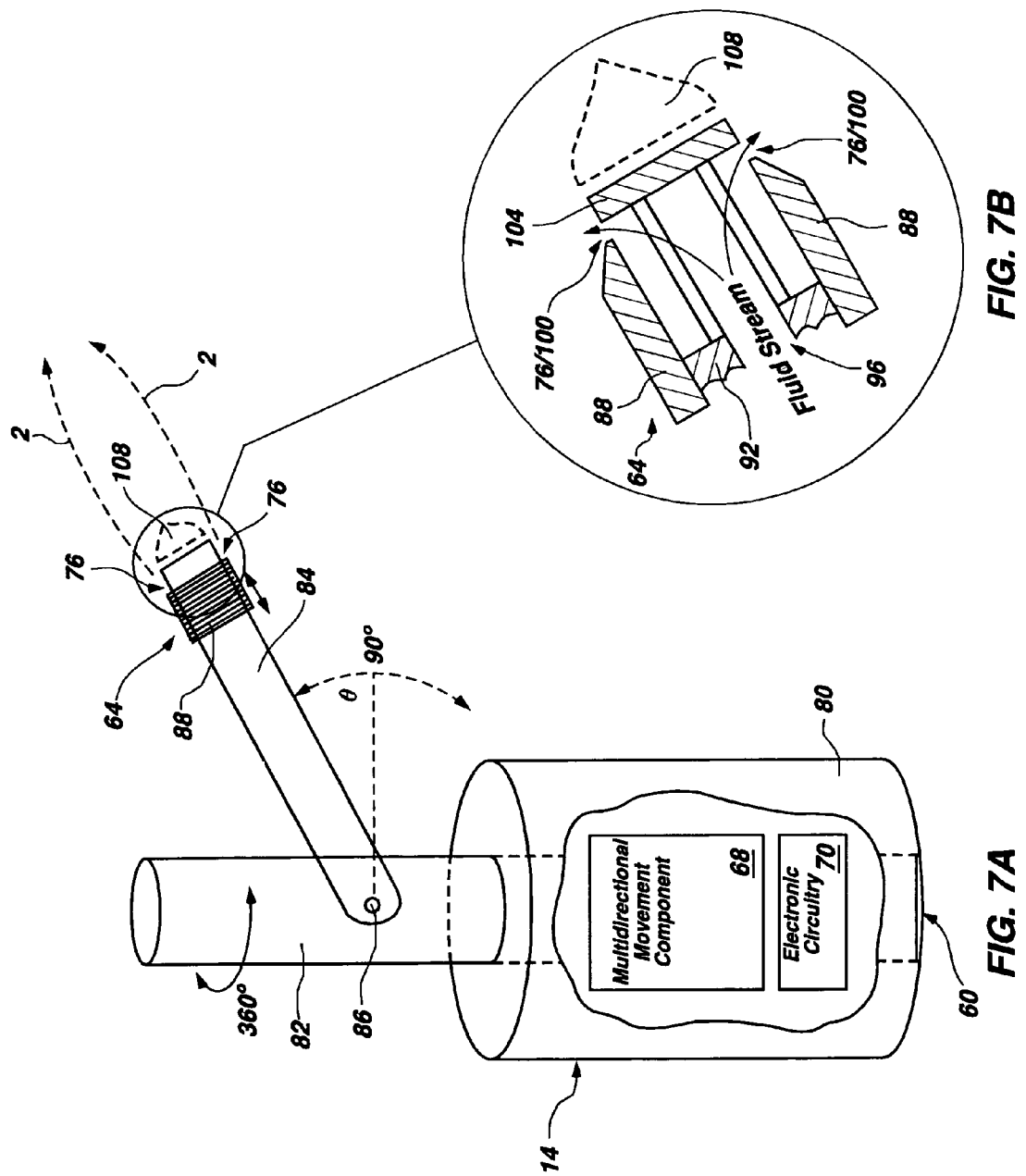
FIG. 7-A illustrates a perspective view of an exemplary programmable sprinkler head.

FIG. 7-A illustrates a perspective view of an exemplary programmable sprinkler head 14. Programmable sprinkler head 14 comprises a fluid inlet 60 for receiving fluid from a fluid source and for properly directing the fluid into programmable sprinkler head 14. In the embodiment shown, programmable sprinkler head 14 comprises a rotatable housing 80 that contains and supports the various structural and other components of programmable sprinkler head 14, namely multidirectional movement component 68 and the electronic circuitry 70 required for connection to a computer system. From rotatable housing 80 rises extension 82 used to support arm 84. As indicated before, programmable sprinkler head 14 is capable of being vector positioned, or more specifically is capable of vector positioning a fluid delivery point 76, thereby largely controlling the direction of the fluid as it is emitted. Therefore, the structural elements making up programmable sprinkler head 14 must be operable to achieve this vector positioning. In the embodiment shown in FIG. 7-A, either rotatable housing 80 or extension 82 or both rotate back and forth about an axis within a possible 360° rotation.

Attached to extension 82 is arm 84 that rotates about a pivot point 86 positioned on extension 82 so as to allow arm 84 to travel about an arc between 0° and 180°. Rotation of housing 80 and/or extension 82 is typically about an axis that is perpendicular to or substantially perpendicular to the ground. Therefore, this rotation provides delivery of fluid within a horizontal plane extending out from programmable sprinkler head 14 in any direction. Conversely, arm 84 rotates about pivot point 86. As such, rotation of arm 84 about this point allows fluid to be delivered in a vertical plane relative to the horizontal plane just described. Essentially, housing 80 and arm 84 function to provide two degrees of freedom to programmable sprinkler head 14. Each of these structures operate in combination with one another to locate a fluid delivery point in any vector position, constrained only by the limitations of the structures themselves. Therefore, as housing 80 or extension 82 rotates within its 360° rotation, arm 84 is also allowed to pivot about pivot point 86. The combination of these two motions is what provides the vector positioning of the fluid delivery point of programmable sprinkler head 14.

Multidirectional movement component 68 is the component that controls the rotation of housing 80 and/or extension 82, as well as the pivoting of arm 84 about pivot point 86. Multidirectional movement component 68 may comprise any mechanism, system, or device capable of rotating housing 80 and/or extension 82, as well as pivoting arm 84 about pivot point 86. Specifically, multidirectional movement component 68 comprises a series of gears and drive means (a motor) capable of rotating housing 80 and/or pivoting arm 84, as well as any other structural components that make up multidirectional movement component 68, to vector position fluid delivery point 76. One ordinarily skilled in the art will recognize other systems or mechanisms that may accomplish the same. Multidirectional movement component 68 is electrically coupled to electronic circuitry 70 so as to be controlled by the computer contained within the intelligent sprinkler irrigation system of the present invention.

FIG. 7-A also illustrates valve component 64 as coupled to or operably supported by arm 84. In the exemplary embodiment shown, valve component 64 comprises a sleeve valve, wherein a sleeve 88 displaces back and forth across an opening to regulate or control the emission of fluid 2 from the opening. Valve component 64 gives programmable sprinkler head 14 a third degree of freedom. Specifically, valve component 64 is capable of regulating the characteristics of delivery of fluid 2, namely the velocity, pressure, geometry and volume of fluid 2. In operation, once fluid delivery point 76 is vector positioned, valve component 64 may be controlled to further vary the point of fluid delivery within the arbitrarily shaped area. For example, if sleeve 88 were in a partially opened position, the delivery location of fluid 2 within an arbitrarily shaped area would be different than if sleeve 88 were in a fully opened position. As such, controlling sleeve 88 to move back and forth across the fluid opening effectively functions to modify the geometry of the fluid delivery and subsequent delivery point of fluid 2.

FIG. 7-B illustrates a detailed view of an exemplary valve component 64. In this embodiment, valve component 64 comprises an elongate body 92 having a lumen 96 therein that is fluidly coupled to or in fluid connection with a corresponding lumen (not shown) existing within arm 84 that provides a steady fluid stream from arm 84 to valve component 64. Formed within elongate body 92 are opposite and complementary openings 100 that are proximate or substantially proximate a fixed core 104 and that are in fluid connection with lumen 96. Openings 100 allow fluid to exit valve component 64 in a precise manner, either in a steady stream or in a bolus depending upon how sleeve 88 is operated. A steady stream may be useful to irrigate larger areas, while a small bolus of fluid may be useful to irrigate specific locations or points within an area. Because the sleeve 88 is slidably disposed about the outer surface of elongate body 92, it is capable of displacing across openings 100 to precisely regulate the emission of fluid 2 through opening 100. The valve component illustrated in FIG. 7-B is described in greater detail in copending U.S. Provisional Patent Application Ser. No. 60/633,249, filed Dec. 2, 2004, and entitled, "Flow Force Compensated Sleeve Valve," which is incorporated by reference in its entirety herein.

Also shown is nozzle 108 that may be used to further control the fluid after exiting openings 100. The nozzle is typically removably coupled to valve component 64 and may comprise any nozzle-type commonly known in the art.

Figure 8:
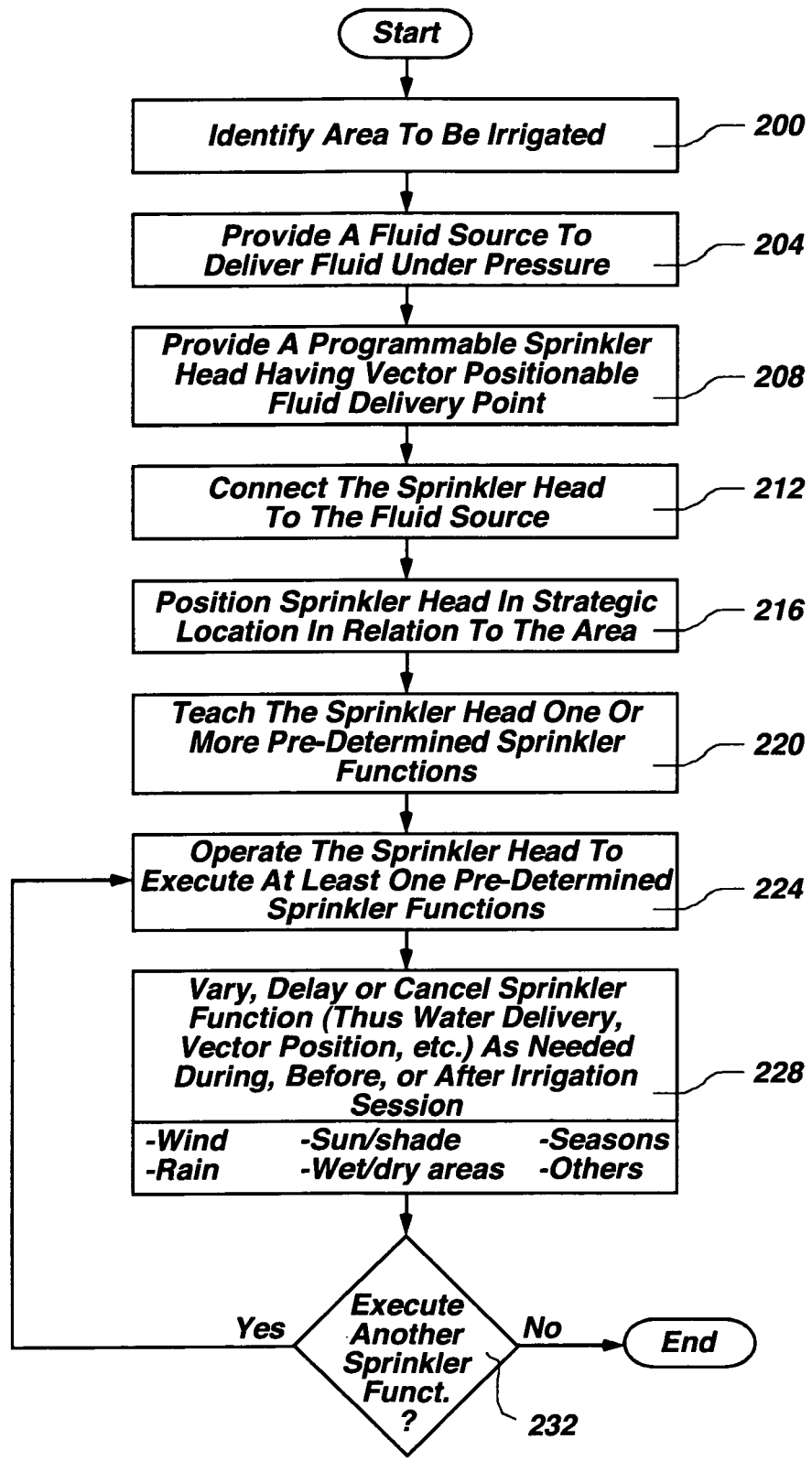
FIG. 8 illustrates a flow diagram of an exemplary method for irrigating an arbitrarily-shaped area.

With reference to FIG. 8, the present invention further features a method for irrigating an arbitrarily-shaped area. To perform this method an area must be identified for irrigation (step 200) and a fluid source provided (step 204). As indicated above, the identified area may be any shape and may comprise multiple levels. The area may also comprise a single point, a line segment, a curved or spline segment, or any combination of these. Upon identifying an area to be irrigated, a programmable sprinkler head is obtained or provided (step 208), wherein the sprinkler head is fluidly connected to a fluid source under pressure (step 212). The area identified to be irrigated will largely dictate the placement or the location of the programmable sprinkler head so as to provide the most efficient fluid coverage of the area. As such, the programmable sprinkler head is placed or positioned in the most optimal location in relation to the identified area to be irrigated (step 216). Once in place, the programmable sprinkler head must be programmed to deliver fluid along a pre-determined fluid flow path. Programming of the sprinkler head effectively generates one or more pre-determined sprinkler functions that, when executed, cause or control the sprinkler head to deliver fluid to the arbitrarily-shaped area along the pre-determined fluid flow path.

The programmable sprinkler head is programmed and the one or more pre-determined sprinkler functions are generated (step 220) by initiating or activating a teach mode within the computer system controlling the operations of the programmable sprinkler head. The method for teaching is described below. Upon completing the programming (teaching) of the programmable sprinkler head, the one or more generated pre-determined sprinkler functions are stored for later retrieval by the computer system upon selection by the user. Thus, upon selection, the sprinkler head is operated (step 224), which operation effectively executes the selected pre-determined sprinkler function to deliver fluid to the arbitrarily shaped area according to the learned pre-determined sprinkler function. Upon completion of one pre-determined sprinkler function, any others may be executed as well (step 232). If no others are to be executed, the sprinkler head is deactivated and the irrigation of the area is terminated.

The present exemplary method further comprises the step of varying or modifying, delaying, or cancelling the sprinkler function, and therefore the flow of the fluid as well as the vector position of the sprinkler head, as needed before, during, or after an irrigation session (step 228) to compensate for extraneous, uncontrollable circumstances. For instance, the present invention contemplates strategically positioning and utilizing various sensors operably coupled to or in communication with the computer system for sensing or detecting weather conditions, such as wind, rain, excessive sun or shade, and/or humidity. The sensors may also be configured to detect or sense emissivity within an area, thus locating and identifying wet and dry areas, wherein the computer may process the information received for comparison purposes to allow drier areas to receive increased irrigation and wet areas to receive decreased irrigation. Indeed, various infra-red sensors may be located about an area for the purpose of monitoring and detecting the emissivity of the area. These sensors would gather and transmit data back to the computer, which would then process the data and update the sprinkler function. This type of intelligent feedback system will greatly increase the efficiency of the irrigation system, thus conserve water. Referring back to FIG. 5, illustrated are several IR sensors strategically located about the area, shown as IR sensors 114-a, 114-b, 114-c, and 114-d, which may be positioned inside or outside the perimeter, or in any location. In addition, any number of sensors may be used. Other types of sensors and conditions may be detected to vary, modify, or delay the sprinkler function.

The present invention also contemplates utilizing various computer programs that may be executed during different times of the year, such as for the changing of seasons. These sensors and seasonal programs are known in the art and are not specifically recited in detail herein. Indeed, one skilled in the art will recognize how the present invention may be practiced with these elements.

Figure 9:
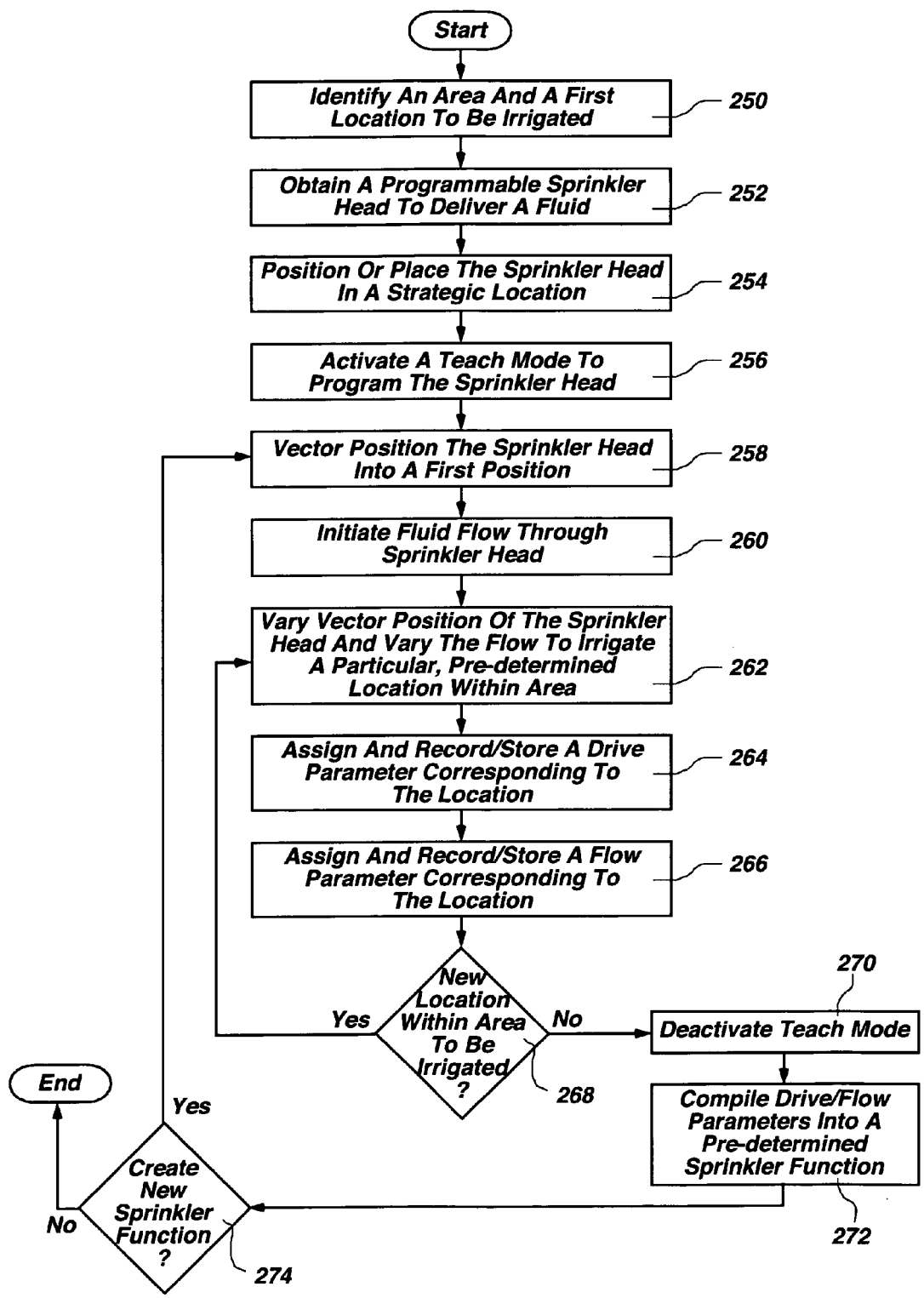
FIG. 9 illustrates a flow diagram of an exemplary method for teaching a programmable sprinkler head to irrigate an arbitrarily-shaped area according to a pre-determined sprinkler function.

With reference to FIG. 9, upon identifying an area to be irrigated (step 250), obtaining a programmable sprinkler head to deliver a fluid (step 252), and positioning the programmable sprinkler head in a strategic location in relation to the identified area (step 254), the method for teaching further comprises activating a teach mode function to program the programmable sprinkler head (step 256). Once in the teach mode, the programmable sprinkler head is prepared to learn and generate a pre-determined sprinkler function corresponding to a pre-determined fluid flow path that will control the sprinkler to deliver a fluid to at least a portion of the identified area. The parameters that will define this pre-determined sprinkler function are at least one or more drive parameters and one or more flow parameters. Other parameters are also contemplated that may be used in conjunction with the drive and flow parameters to define the pre-determined sprinkler function. However, these are the two discussed in detail herein.

In one exemplary embodiment, to program the sprinkler head in the teach mode, the sprinkler head is first vector positioned to deliver flow to a first particular, pre-determined location (step 258). At this time, the vector position of the sprinkler head will only be an approximation of the optimal position needed to deliver fluid to the pre-determined location. To determine the correct vector position, the fluid flow is initiated so that the fluid flows through and is emitted from the sprinkler head (step 260). Depending upon the particular characteristics of the fluid flow and the current vector position of the sprinkler head, the fluid will impact a certain location. At this time, the vector positioning of the sprinkler head or the flow characteristics of the fluid or both of these may be varied as needed to align point of impact of the fluid with the pre-determined location (step 262). Once aligned, an input signal is transmitted to the computer system comprising data corresponding to the exact final vector position of the sprinkler head determined for precisely delivering the flow to the first pre-determined location. This input signal is processed and a drive parameter assigned (step 264). This drive parameter is further processed, recorded, and stored by the computer system for later retrieval. Later retrieval of this particular drive parameter by the computer system, namely during execution of the pre-determined sprinkler function, will control the sprinkler head to return to this exact vector position for the purpose of again delivering fluid precisely to the first pre-determined location in the pre-determined fluid flow path.

In addition to the generation of a drive parameter, an input signal is transmitted to the computer system comprising data corresponding to the final flow characteristics determined for precise delivery of the fluid to the first pre-determined location. This input signal is processed and a flow parameter assigned (step 266). This flow parameter is further processed, recorded, and stored by the computer system for later retrieval just as the drive parameter. Later retrieval of this particular flow parameter by the computer system, namely during execution of the pre-determined sprinkler function, will control the sprinkler head to again deliver or emit the fluid according to the fluid flow characteristics determined to precisely deliver fluid to the first pre-determined location in the pre-determined fluid flow path. In the event a pressure change occurs in the fluid supply line, the processor of the computer system can adjust the drive and flow parameters to compensate accordingly.

Since the pre-determined fluid flow path and arbitrarily-shaped area will most likely comprise multiple locations, the teach method further comprises identifying a new or subsequent pre-determined location and determining if the process steps described above for assigning drive and flow parameters to this subsequent location are to be repeated (step 268). If so, the process repeats by again vector positioning the sprinkler head (step 258), initiating fluid flow (step 260), varying the flow and vector positions until the pre-determined location is irrigated (step 262), and assigning various drive parameters (step 264) and flow parameters (step 266) to this subsequent pre-determined location. This process may be repeated as often as necessary to generate as many drive and flow parameters necessary to complete the pre-determined fluid flow path. It should be noted that accuracy of the fluid delivery along the pre-determined fluid flow path depends upon many things. However, much of the accuracy will depend upon the number of locations assigned drive and flow parameters. Indeed, the more locations along the fluid flow path to which drive and flow parameters are assigned, the more accurate the fluid delivery along this path will be, especially if following a nonlinear segment. For example, it will be obvious to one skilled in the art that a curve is more accurately traced when there are several intermittently spaced reference points (pre-determined locations) that combine to define the curve, rather than just a few. Upon completing the process for the final or last pre-determined location, the teach mode is deactivated (step 270).

The particular method used to practice steps 256-266 may vary. For example, in one aspect, the programmable sprinkler head may be vector positioned using a remote control device. In another aspect, the sprinkler head may be vector positioned using a joystick operably connected to the sprinkler head. In still another aspect, the sprinkler head may simply be manually positioned. In addition, one or more specific components of the sprinkler head may be manipulated to achieve the proper vector position. For example, in one aspect the entire sprinkler housing may be rotated. In another aspect, the component supporting the valve may be manipulated if this is different from the housing (see FIGS. 7-A and 7-B and corresponding discussion above). In still another aspect, the actual fluid emission component (e.g., the valve, the nozzle, etc.) may be manipulated. In essence, the above method contemplates and the present invention includes the ability to manipulate any structural component of the sprinkler head as well as the entire sprinkler head to properly vector position the sprinkler head, and particularly the fluid delivery point inherent therein.

The same is true for the flow characteristics. In one aspect, the flow characteristics may be controlled by a remote valve and valve system. In another aspect, the particular fluid emission component utilized in the sprinkler head may be manipulated. Flow patterns may be laminar, pulsed, sprayed, circular, helical or rotary. In essence, any device or system or method capable of manipulating the fluid flow characteristics of the sprinkler head to achieve the specific fluid flow needed at any given time are contemplated herein as will be apparent and obvious to one skilled in the art.

After generating the several drive and flow parameters corresponding to their respective locations, these are compiled and processed to generate and define a pre-determined sprinkler function (step 272). This sprinkler function is a computer readable program product that comprises the several compiled control parameters (e.g., drive and flow parameters, etc.) that correspond to a particular pre-determined fluid flow path to be followed during operation of the sprinkler system, wherein the program is executable by a computer to control the programmable sprinkler head to precisely deliver a fluid to the pre-determined area in a specific order. The order in which each drive and flow parameter is to be executed is also determined and assigned, and is included as part of the stored pre-determined sprinkler function. In addition, the duration of time each parameter is to be executed before moving onto the next one is also determined and assigned or programmed into the pre-determined sprinkler function. Therefore, the pre-determined sprinkler function not only defines the fluid flow path the sprinkler head is to follow, but also the time that is to be spent delivering fluid to each specific location along the fluid flow path. Thus, a fluid flow path may be traced at any pace desired. The method further includes generating and storing a plurality of predetermined sprinkler functions for later execution, each one corresponding to a different pre-determined fluid flow path (step 274). Those skilled in the art will also be aware that the sprinkler function can be continuously variable with rotation or movement of the sprinkler head, as opposed to operating on a point-to-point basis. This can be accomplished by integrating the parameters over the geometric limits of the treated area.

Figure 10:
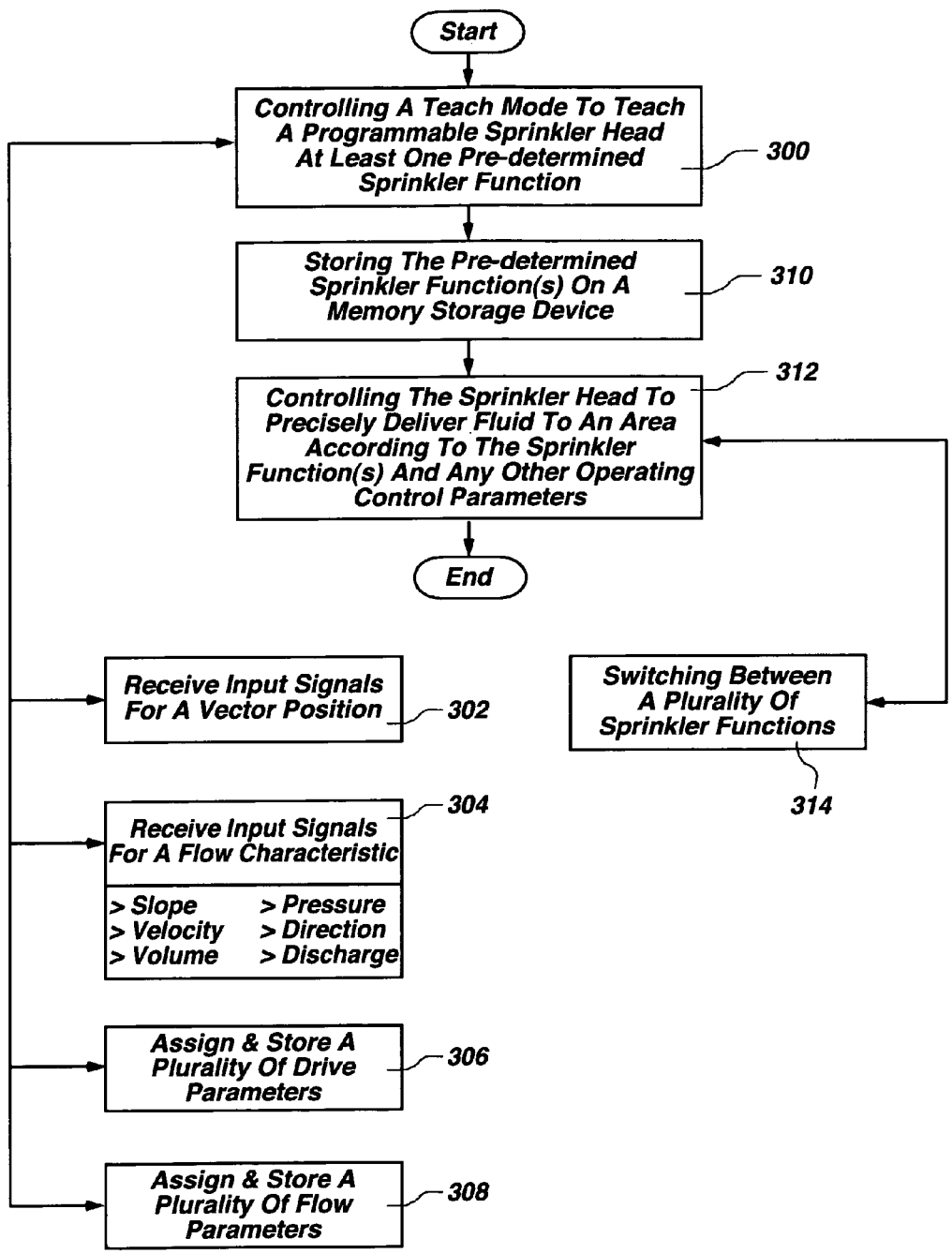
FIG. 10 illustrates a flow diagram of an exemplary method within a computer system for irrigating an arbitrarily-shaped area.

With reference to FIG. 10, the present invention further comprises a method in a computer system for performing the functions discussed above. In the computer system, the computer controls a teach mode to teach a programmable sprinkler head at least one pre-determined sprinkler function corresponding to an area to be irrigated and a pre-determined fluid flow path to be followed during irrigation of the area (step 300). This step more particularly comprises controlling the computer to receive input signals corresponding to a vector position of the sprinkler head (step 302), to receive input signals corresponding to flow characteristics of the sprinkler head (e.g., the slope, velocity, volume, pressure, direction, and/or discharge of the fluid) (step 304), to assign and store a plurality of drive parameters based on the received input signals (step 306), and to assign and store a plurality of flow parameters based on the receive input signals (step 308).

The input signals can be generated from a user directly or may be generated from feed back devices remotely positioned throughout, or in view of, the irrigation area. Such input devices may include camera's capable of monitoring the activity within the irrigation area, or sensor plates within the irrigation area capable of monitoring environmental conditions of the irrigation area. These feedback devices will then supply the sprinkler control computer with input signals which will be used in controlling the irrigation system operation.

Each pre-determined sprinkler function generated is processed and stored on a memory storage device by the computer system (step 310) for later retrieval and execution during operation of the sprinkler irrigation system. Once at least one pre-determined sprinkler function is generated and stored, the computer system may recall this sprinkler function during operation of the irrigation system, which sprinkler function causes or controls the sprinkler head to deliver fluid in a precise manner to the arbitrarily-shaped area along the pre-determined fluid flow path, wherein operation further comprises executing any additional control parameters that may have been assigned (step 312). More specifically, during execution of a pre-determined sprinkler function, the computer recalls the specific drive and flow parameters assigned and compiled into the pre-determined sprinkler function in the systematic order assigned, which causes the fluid to be delivered as intended.

Additional control parameters may include the date, time, and/or frequency one or more pre-determined sprinkler functions is to be executed, and any others commonly known in the art. Each of these may be set up to be controlled by the computer system described herein. In addition, the computer may also control executing a plurality of pre-determined sprinkler functions (step 314) as directed by the user.

Of course, it is contemplated that any of the pre-determined sprinkler functions and other control parameters generated and stored may be modified, edited, deleted, or otherwise manipulated by the user as desired according to commonly understood computer programming rules.

Additionally, it is contemplated the unique intelligent sprinkler irrigation system may be programmed and used in a recreational capacity. The sprinklers may be programmed to work at random times for intermittent lengths while people are present in the irrigation envelope of the system. Alternatively, the system may be programmed to spout water in aesthetically pleasing patterns effectively creating a lawn fountain.

Figure 11:
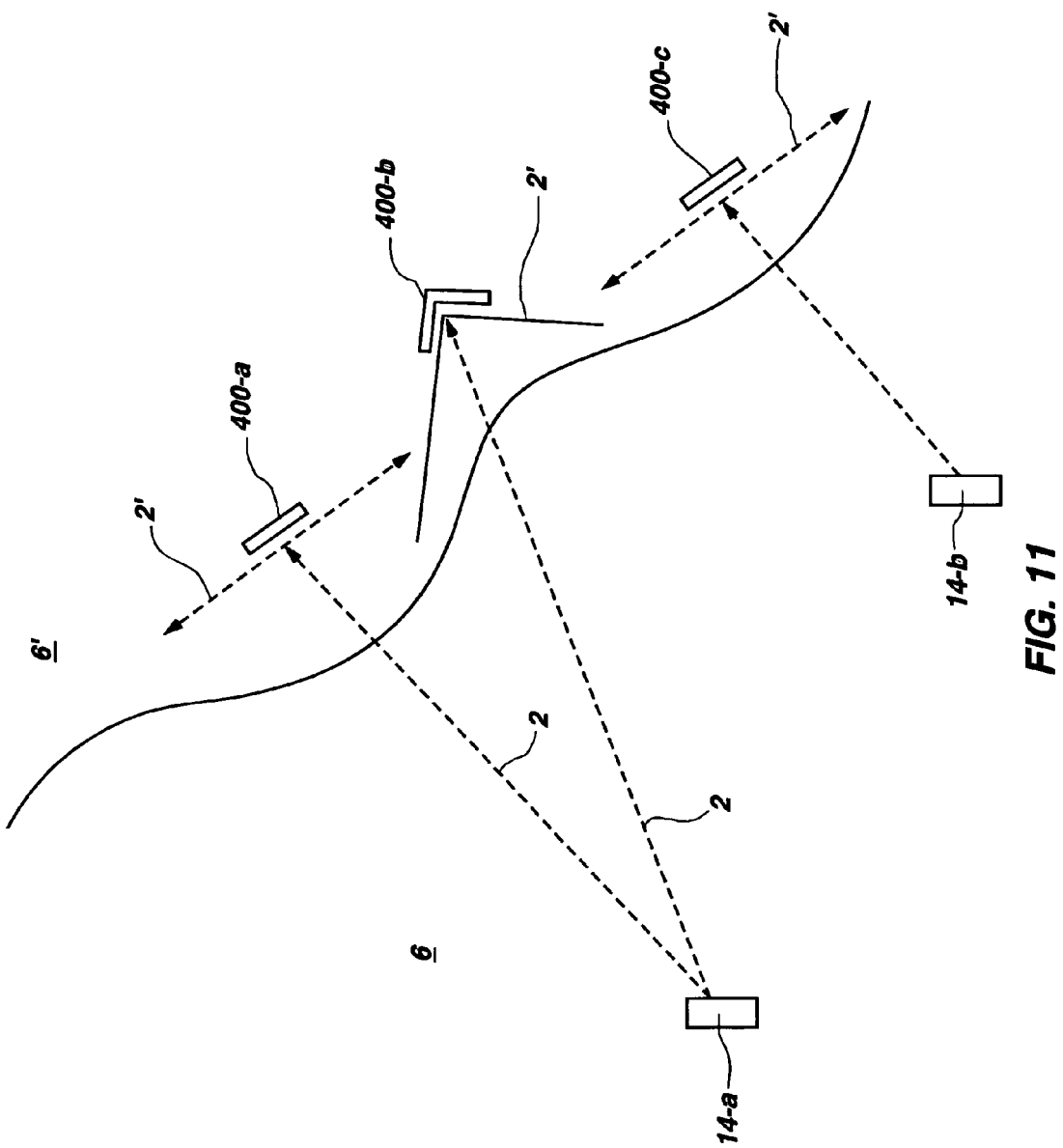
FIG. 11 illustrates a perspective view of another exemplary sprinkler irrigation system comprising deflector plates designed to redirect the flow of the fluid from the sprinkler head.

With reference to FIG. 11, shown is a perspective view of a sprinkler irrigation system according to another exemplary embodiment of the present invention. Specifically, FIG. 11 illustrates a plurality of deflectors 400 strategically positioned within an arbitrarily shaped area 6' (e.g., a flower bed) adjacent another arbitrarily shaped area 6 (e.g., a lawn). Deflectors 400 are shown as deflectors 400-a, 400-b, and 400-c. Within the arbitrarily shaped area 6 are one or more programmable sprinkler heads 14, shown as sprinkler heads 14-a and 14-b, such as those described above, that are configured to emit a stream of fluid 2 for the purpose of impacting the deflectors 400-a, 400-b, and 400-c, respectively, in order to redirect the fluid stream to a desired area to be watered or irrigated. As shown, sprinkler head 14-a is configured to supply a stream of fluid 2 to deflectors 400-a and 400-b, either simultaneously or in succession. Deflectors 400-a and 400-b are strategically positioned within the arbitrarily shaped area 6' and away from the sprinkler head 14-a. Upon operation of the sprinkler head 14-a to emit the fluid 2 toward the deflectors 400-a and 400-b, the fluid 2 impacts the deflectors 400-a and 400-b, thus causing the fluid 2 to be redirected outward or away from the deflectors 400, as indicated by the arrows 2'.

Deflector 400-a comprises a linear and planar surface configuration oriented substantially perpendicular to the direction of flow of fluid 2, thus causing the fluid 2' to disperse substantially orthogonally from the stream of fluid 2 upon impact (or parallel to the surface of the deflector 400-a), and thus irrigating the areas adjacent the deflector 400-a, as shown. Of course, as will be recognized by one skilled in the art, deflector 400-a may be oriented differently to redirect the fluid flow in different directions.

Deflector 400-b comprises a linear, but non-planar, surface configuration (e.g., orthogonal or L-shaped, or various other angled configurations) configured to increase the opposition to the flow of fluid 2 and to redirect the fluid 2 somewhat back toward the sprinkler head 14-a, which is illustrated by fluid 2'.

A second sprinkler head 14-b functions to emit fluid 2 for the purpose of contacting deflector 400-c, shown having a linear and planar surface configuration, to irrigate the area adjacent the deflector 400-c similar to that of deflector 400-a. From this, it can be seen that the strategic placement and use of deflectors having a pre-determined shape provides the ability to adequately and accurately irrigate the arbitrarily shaped area 6' no matter what its shape may be. As will be obvious to one skilled in the art, any number of sprinkler heads 14 and deflectors 400 may be used to irrigate an area.

Deflectors 400 are designed to be positioned about the area to be irrigated. Their placement may be secured using any known means, such as a stake or rod coupled thereto for penetrating the ground, or a stand that simply rests on the ground. In addition, they may comprise various sizes, shapes, and surface configurations depending upon the area to be irrigated.

FIGS. 12-A-12-C illustrates several different embodiments of deflectors. Specifically, FIG. 11-A illustrates a top view of a deflector 400 having a planar surface configuration. Deflector 400 is shown as comprising a first member 404, having a surface 406, pivotally coupled to a second member 408, also having a surface 410, via pivot means 412, which may be a hinged component or any other device or structure capable of pivotally coupling two or more components together. The first and second members 404 and 408 are adjusted or oriented so as to comprise a planar surface configuration designed to redirect a flow of fluid 2 in an orthogonal direction, as indicated by fluid 2', upon impact with the deflector 400. Of course, pivot means 412 may be optional as the deflector 400 may comprise a single structure rather than first and second members 404 and 408.

FIG. 12-B illustrates a top view of a deflector 400. In this embodiment, the deflector 400 comprises a non-planar surface configuration. Deflector 400 is also shown as comprising a first a first member 404, having a surface 406, pivotally coupled to a second member 408, also having a surface 410, via pivot means 412. The first and second members 404 and 408 are adjusted or oriented so as to comprise a non-planar surface configuration (shown as an L-shape) designed to redirect a flow of fluid 2 more towards the original flow of fluid 2 and back toward the sprinkler head (not shown), as indicated by fluid 2', upon impact with the deflector 400. Again, pivot means 412 may be optional as the deflector 400 may comprise a single structure rather than first and second members 404 and 408.

FIG. 12-C illustrates a side view of the deflector 400. In this embodiment, the deflector 400 comprises a single structure having a surface 420 oriented upward with respect to the flow of fluid 2, thus redirecting the fluid 2 in an upward direction, as indicated by the flow of fluid 2'. Also shown, in phantom view, the deflector 400 may be pivotally coupled to a securing means 428, thus allowing the deflector 400, and particularly the surface 420, to be oriented downward, thus redirecting the fluid 2 in a downward direction, as indicated by the flow of fluid 2'.

It is noted herein that other deflector configurations are possible and contemplated herein, as will be obvious to one skilled in the art, and which are intended to be covered by the present invention.

As an alternative to using a deflector to deliver fluid to a pre-determined location, the present invention contemplates using a programmable sprinkler head to deliver a bolus of fluid to a specific point or area, wherein the bolus of fluid would be launched from the sprinkler head and land, as soft as possible, at the designated location. Unlike nozzles or other fluid delivery devices that produce a lot of spray during fluid emission, a bolus of fluid may be delivered to the pre-determined location without spray, thus reducing evaporation potential, and thus helping to conserve water. The programmable sprinkler head described above and illustrated in FIGS. 7-A and 7-B represent one exemplary, yet preferred, embodiment for delivering a bolus of fluid. As in other embodiments, the programmable sprinkler head may operate to execute a sprinkler function to irrigate as desired.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited, except in the specification. Accordingly, the scope of the invention should be determined solely by the appended claims and their legal equivalents, rather than by the descriptions and examples given above.

What is claimed and desired to be secured by Letters Patent is:

1. An intelligent sprinkler irrigation system for attachment to a pressurized fluid source for delivering fluid to an arbitrarily-shaped area, said system comprising:
   at least one programmable sprinkler head fluidly connected to said fluid source, said sprinkler head comprising:
      an inlet for receiving said fluid;
      a valve component fluidly connected to said inlet for regulating emission of said pressurized fluid;
      a multidirectional movement component configured to vector position said sprinkler head;
   at least one sensor strategically located about said arbitrarily-shaped area to define one or more irrigation boundaries and to output one or more signals to define a pre-determined sprinkler function, said sensor being selected from one or a combination of a force sensor that detects application of force provided by said fluid as emitted from said valve component, and an optical sensor that detects an optical signal output by an optical signal transceiver in said sprinkler head, said optical signal transceiver receives a corresponding optical signal as returned by said optical sensor;
   a computer system configured to receive said signals from said sensors and control said sprinkler head according to a said pre-determined sprinkler function, said computer system comprising:
      a teach mode, wherein a plurality of control parameters are learned and recorded via said sensor to control said sprinkler head, said plurality of control parameters defining said pre-determined sprinkler function; and
      an operation mode for executing said pre-determined sprinkler function to precisely deliver said fluid to at least a portion of said arbitrarily-shaped area.

2. The system of claim 1, wherein said teach mode is configured to learn and record a plurality of drive parameters that control said vector positioning of said sprinkler head by said movement component, said plurality of drive parameters defining, at least in part, said pre-determined sprinkler function.

3. The system of claim 1, wherein said teach mode is further configured to learn and record a plurality of flow parameters that control said valve component and that further define, at least in part, said pre-determined sprinkler function.

4. The system of claim 3, wherein said flow parameters define at least one of a fluid flow rate, a slope, a velocity, a volume, a direction, a pressure, a geometric fluid configuration and a discharge of said fluid as emitted from said valve.

5. The system of claim 1, wherein said computer system comprises a visual map of said arbitrarily-shaped area.

6. The system of claim 1, further comprising control means for controlling said computer system.

7. The system of claim 6, wherein said control means resides in a location remote from said programmable sprinkler head and is operably connected to said computer.

8. The system of claim 6, wherein said control means is a portable system operably connectable to said computer system.

9. The system of claim 1, further comprising means for powering said computer system.

10. The system of claim 1, wherein said computer system is contained within said programmable sprinkler head.

11. The system of claim 1, wherein said computer system resides in a location remote from said sprinkler head.

12. The system of claim 1, further comprising a plurality of sensors, wherein said sensors are strategically located to provide a pre-determined sprinkler function that comprises a fluid flow path that irrigates along a shape of said arbitrarily-shaped area.

13. The system of claim 1, further comprising a plurality of sensors, wherein said sensors are strategically located to provide a pre-determined sprinkler function that comprises a fluid flow path that irrigates along a perimeter of said arbitrarily-shaped area.

14. The system of claim 1, further comprising a plurality of sensors, wherein said sensors are strategically located to provide a pre-determined sprinkler function that comprises a fluid flow path that irrigates a pre-determined section within said arbitrarily-shaped area.

15. The system of claim 1, wherein said sensor is strategically located to provide a pre-determined sprinkler function that comprises a fluid flow path that irrigates a pre-determined point within said arbitrarily-shaped area.

16. The system of claim 1, wherein said computer system is configured to control said sprinkler head and precisely deliver said fluid to at least a portion of said arbitrarily-shaped area according to a plurality of pre-determined sprinkler functions.

17. The system of claim 16, wherein said plurality of pre-determined sprinkler functions are selectively operable with one another.

18. The system of claim 1, wherein said valve is configured to vector position within said sprinkler head, controlled by said computer.

19. The system of claim 1, wherein said valve component is a sleeve valve comprising:
   an elongate body having an outer surface and including a lumen for receiving said fluid and an associated fluid pressure therein;
   at least one opening formed through said outer surface and in fluid connection with said lumen; and
   a sleeve slidably disposed about said outer surface and configured to displace across said opening to precisely regulate emission of said fluid through said opening, said sleeve and elongate body being operably related, such that forces necessary to displace said sleeve across said opening are substantially unaffected by said fluid pressure at said opening.

20. The system of claim 19, wherein said computer controls the displacement of said sleeve across said opening, thus regulating said fluid emission.

21. The system of claim 1, wherein said programmable sprinkler head is fluidly connected to said fluid source via delivery means.

22. The system of claim 21, wherein said delivery means comprises a conduit type structure selected from the group consisting of a pipe, a pipe system, and a hose.

23. The system of claim 1, wherein said movement component is configured to vector position said valve component.

24. The system of claim 1, wherein said movement component comprises:
   a rotatable housing configured to pivot about a vertical axis; and
   an arm pivotally coupled to said housing and supporting said valve component and configured to pivot about a horizontal axis.

25. The system of claim 24, wherein said housing rotates back and forth within a 360° rotation about said vertical axis.

26. The system of claim 24, wherein said valve component and said arm travel about an arc between 0 and 90 degrees above said horizontal axis and between 0 and 90 degrees below said horizontal axis.

27. The system of claim 1, wherein said valve component is configured to oscillate between an open and closed position to selectively deliver a bolus of said fluid to a specifically defined location.

28. The system of claim 1, wherein said valve component is configured to deliver said fluid in a steady, non-fractioned stream.

29. The system of claim 1, wherein said valve component is configured to deliver said fluid in a fractioned stream.

30. The system of claim 1, further comprising a plurality of programmable sprinkler heads controlled by said computer system, each one operable with one or more sensors to define one or more sprinkler functions, and each one delivering fluid to at least a portion of said arbitrarily shaped area according to a said one or more pre-determined sprinkler functions.

31. The system of claim 1, wherein said pre-determined sprinkler function comprises a fluid flow path capable of irrigating multiple levels within said arbitrarily-shaped area.

32. The system of claim 1, wherein said programmable sprinkler head further comprises a nozzle coupled to said valve component.

33. The system of claim 1, further comprising at least one sensor strategically located about said arbitrarily-shaped area for sensing one or more conditions about said arbitrarily-shaped area.

34. The system of claim 33, wherein said computer system further comprises a sensing/feedback component configured to receive and process data gathered by said sensor for the purpose of affecting said sprinkler function in a manner selected from the group consisting of modifying, delaying, and cancelling said sprinkler function.

35. The system of claim 34, wherein said sensing/feedback component further functions to compare said data against pre-defined condition parameters to determine how to affect said sprinkler function.

36. An intelligent sprinkler system comprising:
   a programmable sprinkler head for use within an intelligent sprinkler irrigation system, said programmable sprinkler head comprising:
      an inlet for receiving said fluid from a fluid source;
      a fluid directory device fluidly connected to said inlet for dictating and delivering a particular type of emission of said fluid;
      a computer processor operable with the sprinkler head and configured to execute a pre-determined sprinkler function to precisely deliver said fluid to at least a portion of an arbitrarily-shaped area; and
   at least one sensor strategically located about said arbitrarily-shaped area, said sensor being positioned to define one or more irrigation boundaries, and to communicate data to said computer processor of said programmable sprinkler head for the purpose of defining said sprinkler function, wherein said programmable sprinkler head is caused to emit said fluid into said area to contact said sensor, said sensor detects said fluid emission and communicates corresponding data to said computer processor, wherein said computer processor processes said data to learn said boundary and to define a sprinkler function based on said data, said sprinkler head being configured to operate based on said sprinkler function.

37. The system of claim 36, wherein said fluid directory device is selected from the group consisting of a nozzle-type device and a sleeve valve-type device.

38. The system of claim 36, wherein said sensor comprises a sensor cable configured to define an area for irrigation or non-irrigation.

39. The system of claim 36, wherein said sensor comprises a force sensor to detect the physical application of fluid as emitted thereon.

40. The method of claim 38, further comprising varying said fluid delivery through the sprinkler head.

41. The method of claim 40, wherein said varying comprises varying at least one fluid flow characteristic selected from the group consisting of rate, volume, velocity, pressure, slope, direction, geometry and discharge.

42. A method for irrigating an arbitrarily-shaped area comprising:
    identifying an area to be irrigated;
    providing a fluid source configured to deliver a pressurized fluid;
    providing a programmable sprinkler head having a fluid directory device fluidly connected to said inlet for regulating emission of said pressurized fluid, a computer processor operable with the sprinkler head and configured to execute a pre-determined sprinkler function for delivering said fluid according to the pre determined sprinkler function;
    connecting said programmable sprinkler head to said fluid source;
    positioning said sprinkler head in a strategic position in relation to said area;
    locating a plurality of sensors about said area, said sensors being positioned to define one or more irrigation boundaries;
    causing said programmable sprinkler head to emit said fluid and to contact said plurality of sensors, said sensors detecting said emission of said fluid and communicating data to said computer processor to learn said boundary and define said sprinkler function;
    operating said programmable sprinkler head to execute said pre-determined sprinkler function to precisely deliver said fluid to and irrigate at least a portion of said arbitrarily-shaped area.

43. The method of claim 42, further comprising teaching said programmable sprinkler head the pre-determined sprinkler function and recording the pre-determined sprinkler function for future processing.

44. The method of claim 43, wherein said teaching comprises learning and recording a plurality of drive parameters that control and vector position said fluid directory device about a vertical axis and a horizontal axis to define said pre-determined sprinkler function.

45. The method of claim 44, wherein said teaching comprises learning and recording a plurality of flow parameters for said fluid directory device that dictate said delivery of said fluid to further define said pre-determined sprinkler function.

46. The method of claim 44, wherein said teaching comprises locating said fluid directory device at a pre-determined orientation to define a drive parameter.

47. The method of claim 46, wherein said locating is repeated at other orientations to define said plurality of drive parameters.

48. The method of claim 45, wherein said flow parameters define at least one of a fluid flow rate, a slope, a velocity, a volume, a direction, a pressure, geometry and a discharge of said fluid as emitted from said fluid directory device.

49. The method of claim 45, wherein said teaching comprises locating said valve component fluid directory device at a pre-determined orientation to define a flow parameter.

50. The method of claim 49, wherein said locating is repeated at other orientations to define said plurality of flow parameters.

51. The method of claim 42, further comprising providing a computer system within said programmable sprinkler head.

52. The method of claim 42, wherein said positioning comprises positioning said programmable sprinkler head proximate said area.

53. The method of claim 42, wherein said positioning comprises positioning said programmable sprinkler head within said area.

54. The method of claim 44, wherein said operating selectively executes said plurality of pre-determined sprinkler functions.

55. The method of claim 42, further comprising:
    sensing a condition about said arbitrarily-shaped area;
    communicating data to said computer corresponding to said condition;
    processing and comparing said data against pre-defined condition parameters; and
    selecting from one of modifying, delaying, and cancelling said sprinkler function based on said data and said pre-defined condition parameters.

56. A method for teaching a programmable sprinkler head to deliver fluid according to a pre-determined sprinkler function, said method comprising:
    obtaining a programmable sprinkler head configured to deliver a fluid;
    identifying an area to be irrigated;
    positioning said programmable sprinkler head in a strategic location in relation to said area;
    locating a plurality of sensors about said area, said sensors being positioned to define one or more irrigation boundaries;
    activating a teach mode configured to electronically program said programmable sprinkler head;
    causing said programmable sprinkler head to emit said fluid and to contact said plurality of sensors, said sensors detecting said emission of said fluid and communicating data to said computer processor to learn said boundary and define said sprinkler function,
    wherein a plurality of drive parameters are assigned to a plurality of particular vector positions of said sprinkler head, respectively, said vector positions corresponding to respective pre-determined and identified locations within said arbitrarily-shaped area, and
    wherein a plurality of flow parameters coinciding with said plurality of drive parameters are assigned at each of said vector positions of said sprinkler head, said drive parameters and said flow parameters providing a basis for a pre-determined sprinkler function for precise irrigation of at least a portion of said arbitrarily-shaped area.

57. The method of claim 56, wherein said assigning said drive parameters comprises manipulating said sprinkler head through various vector positions, and wherein said assigning said flow parameters comprises manipulating a flow rate so that said vector positions and an associated fluid flow therefrom physically contact said sensors at least a portion of said area, thereby assigning said drive and flow parameters.

58. The method of claim 56, further comprising creating and defining a plurality of pre-determined sprinkler functions.

59. The method of claim 56, further comprising deactivating said teach mode and actuating said programmable sprinkler head to execute said pre-determined sprinkler function to precisely deliver said fluid to said area as directed by said drive and flow parameters.

60. A computer program product for use within an intelligent sprinkler irrigation system, said computer program product comprising:
    a computer usable medium having computer readable program code means embodied in said medium for causing a programmable sprinkler head to deliver fluid according to a pre-determined sprinkler function, said computer readable program code means comprising:
    computer readable program code means for causing a computer to receive a series of input signals within a teaching mode that correspond to a particular fluid flow path to be followed when irrigating at least a portion of said area, said input signals generated by a plurality of sensors located about said area to define one or more irrigation boundaries, said sensors outputting a signal corresponding to one or a combination of a physical application of force by said fluid on said sensor, and an optical input signal, each as provided by said programmable sprinkler head, said sensors communicating data to said computer processor to learn said boundary and define said sprinkler function;
    computer readable program code means for causing said computer to process said input signals to establish a pre-determined sprinkler function and to store said pre-determined sprinkler function on a memory storage device;
    computer readable program code means for causing said computer to communicate said pre-determined sprinkler function to said programmable sprinkler head; and
    computer readable program code means for causing said computer to actuate said programmable sprinkler head to precisely deliver said fluid to at least a portion of said area according to said pre-determined sprinkler function.

61. The computer program product of claim 60, wherein said input signals comprise one or more drive parameters.

62. The computer program product of claim 60, wherein said input signals comprise one or more flow parameters.

63. An intelligent sprinkler system comprising:
    a programmable sprinkler head for use within an intelligent sprinkler irrigation system, said programmable sprinkler head comprising:
    an inlet for receiving said fluid from a fluid source;
    a fluid directory device fluidly connected to said inlet for dictating and delivering a particular type of emission of said fluid;
    a computer processor operable with the sprinkler head and configured to execute a pre-determined sprinkler function to precisely deliver said fluid to at least a portion of an arbitrarily-shaped area; and
    at least one sensor strategically located about said arbitrarily-shaped area, said sensor being positioned to define one or more irrigation boundaries, and to communicate data to said computer processor of said programmable sprinkler head,
    wherein said sensor is an optical sensor, and wherein said sprinkler head comprises an optical signal transceiver configured to output an optical signal to be received by said optical sensor and to receive said optical signal as returned by said optical sensor, to define said sprinkler function.

* * * * *